United States Patent
Onai et al.

(10) Patent No.: US 8,660,309 B2
(45) Date of Patent: Feb. 25, 2014

(54) IMAGE PROCESSING APPARATUS, IMAGE PROCESSING METHOD, IMAGE PROCESSING PROGRAM AND RECORDING MEDIUM

(75) Inventors: Rikio Onai, Choufu (JP); Tomohiro Sato, Choufu (JP); Masaya Mori, Shinagawa-ku (JP); Masahiro Sanjo, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 52 days.

(21) Appl. No.: 13/502,972

(22) PCT Filed: Oct. 18, 2010

(86) PCT No.: PCT/JP2010/068281
§ 371 (c)(1),
(2), (4) Date: Apr. 19, 2012

(87) PCT Pub. No.: WO2011/049046
PCT Pub. Date: Apr. 28, 2011

(65) Prior Publication Data
US 2012/0201423 A1 Aug. 9, 2012

(30) Foreign Application Priority Data
Oct. 20, 2009 (JP) ................................. 2009-241233

(51) Int. Cl.
*G06K 9/00* (2006.01)
(52) U.S. Cl.
USPC ........................................................ 382/103
(58) Field of Classification Search
None
See application file for complete search history.

(56) References Cited

U.S. PATENT DOCUMENTS

| | | | |
|---|---|---|---|
| 7,218,775 B2 * | 5/2007 | Kokko et al. | 382/156 |
| 7,961,241 B2 * | 6/2011 | Yuyama | 348/333.02 |
| 2005/0190986 A1 * | 9/2005 | Sakurai | 382/275 |
| 2007/0216784 A1 | 9/2007 | Yuyama | |
| 2009/0225180 A1 * | 9/2009 | Maruyama et al. | 348/222.1 |

FOREIGN PATENT DOCUMENTS

| | | |
|---|---|---|
| JP | 02-090378 A | 3/1990 |
| JP | 2002-203242 A | 7/2002 |
| JP | 2005-122320 A | 5/2005 |
| JP | 2006-277293 A | 10/2006 |
| JP | 2007-200020 A | 8/2007 |
| JP | 2007-251700 A | 9/2007 |
| JP | 2007-251720 A | 9/2007 |

OTHER PUBLICATIONS

Morde et al., "A Novel Approach to Planar Camera Calibration," pp. 1-6.

(Continued)

*Primary Examiner* — Nancy Bitar
(74) *Attorney, Agent, or Firm* — Sughrue Mion, PLLC

(57) ABSTRACT

There are provided an image processing apparatus, an image processing method and an image processing program for transforming a target image having no contour of straight line portions. An ellipse E1 by which the target image is approximated is calculated (S20), a center candidate O.sub.A of the target image is decided (S21), a first polygon P1 associated with the ellipse and the center candidate is calculated (S22), a projective transformation matrix for projectively transforming the first polygon into a second polygon P1' associated with an ellipse whose center is a point where the center candidate is projectively transformed is calculated (S23), and the target image is projectively transformed based on the projective transformation matrix to obtain a transformation image (S24).

17 Claims, 22 Drawing Sheets

(56) References Cited

OTHER PUBLICATIONS

Obdrzalek et al., "Object Recognition Using Local Affine Frames on Maximally Stable Extremal Regions," J. Ponce et al. (Eds.): Toward Category-Level Object Recognition, LNCS 4170, 2006, pp. 83-104.

Treibergs et al., "The Geometry Perspective Drawing on the Computer," Mathematics of Perspective Drawing, 2007, pp. 1-18.
Kenneth Auvil, "Perspective Drawing," 2nd Ed., pp. 27-29 and 35-41.

* cited by examiner

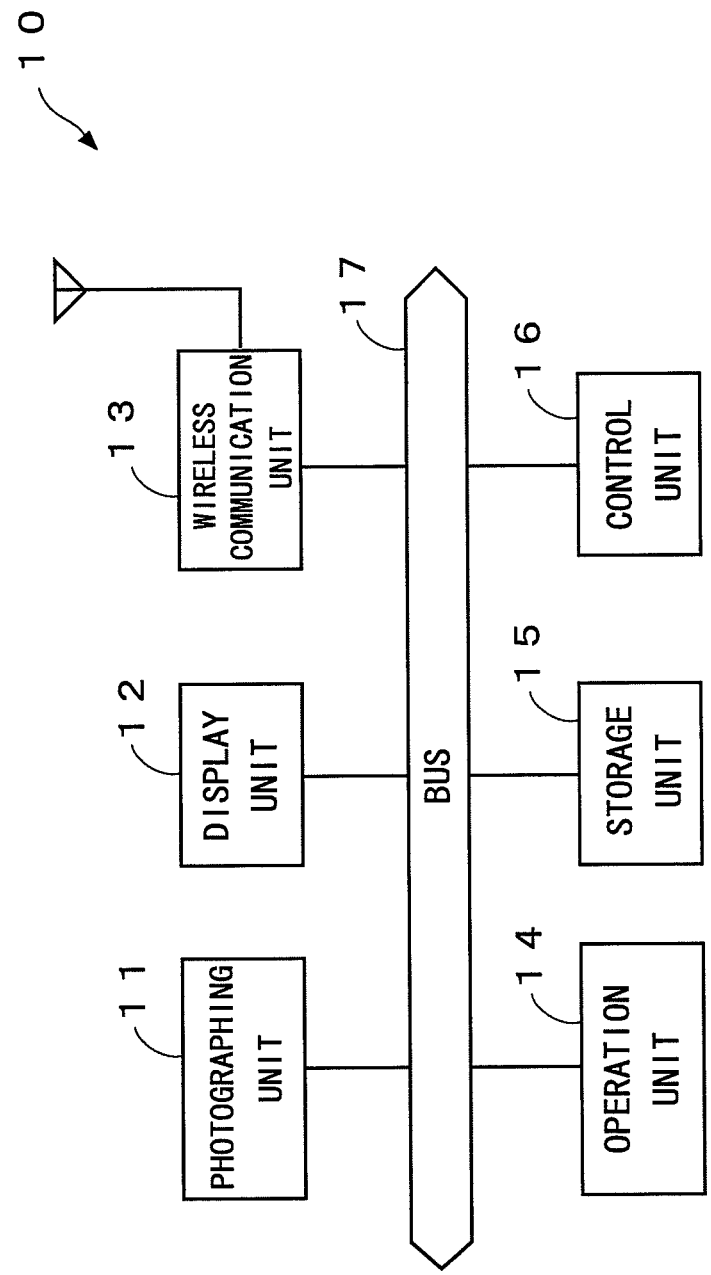

IMAGE PROCESSING APPARATUS, IMAGE PROCESSING METHOD, IMAGE PROCESSING PROGRAM AND RECORDING MEDIUM

CROSS REFERENCE TO RELATED APPLICATIONS

This application is a National Stage of International Application No. PCT/JP2010/068281 filed Oct. 18, 2010, claiming priority based on Japanese Patent Application No. 2009-241233 filed Oct. 20, 2009, the contents of all of which are incorporated herein by reference in their entirety.

TECHNICAL FIELD

The present invention relates to an image processing apparatus, an image processing method, an image processing program and recording medium for transforming image data.

BACKGROUND ART

In recent years, a digital camera has been reduced in size and a portable terminal is provided with a digital camera. A user can easily take photos of landscapes, documents or characters/drawings displayed on a whiteboard by a portable terminal with camera even when the user is away from home. However, while the user can easily take photos even when the user is away from home, a shooting location may be limited due to a condition of the user's standing position, a blackboard may be difficult to photograph from its front due to a position of the user's seat, or a shooting angle may be limited due to a relationship between a target to be photographed and an angle of light when, for example, the user goes hiking in the mountains or finds a desired target.

In order to correct an image of a target to be photographed such as documents or characters written on a whiteboard and to obtain an image which seems to be photographed from its front, for example, Patent Document 1 discloses therein an image processing apparatus for obtaining a contour by use of a Roberts filter from a photographed image of a target whiteboard, detecting candidate straight lines forming the image of the whiteboard from the obtained contour, obtaining a quadrangular shape of the whiteboard, and finding projective parameters indicating the relationship between the image of the whiteboard and the actual whiteboard based on the vertexes of the quadrangle to projectively transform the image of the whiteboard.

CITATION LIST

Patent Document

Patent Document 1: Japanese Patent Application Laid-Open No. 2005-122320

SUMMARY OF THE INVENTION

Problem to be Solved by the Invention

However, since a shooting target is corrected based on the straight lines of documents and the like in the related art, it is difficult to correct the shooting target and to obtain an image which seems to be photographed from its front when a shooting target having few straight lines such as a flower is to be photographed.

The present invention has been made in light of the problems, and an exemplary object is to provide an image processing apparatus, an image processing method, an image processing program and recording medium which enables even a target image having no contour of straight lines to be transformed into an image displayed in a desired orientation.

Means for Solving the Problem

In order to solve the above problems, the invention described in claim 1 is an image processing apparatus for performing an image processing for a target image including an ellipse calculating means that calculates an ellipse by which the target image is approximated, a center candidate deciding means that decides a center candidate of the target image, a polygon calculating means that calculates a first polygon associated with the ellipse and the center candidate, a projective transformation matrix calculating means that calculates a projective transformation matrix which projectively transforms the first polygon into a second polygon associated with an ellipse whose center is a point where the center candidate is projectively transformed, and a transformation image obtaining means that projectively transforms the target image based on the projective transformation matrix and obtains a transformation image.

The invention described in claim 2 is the image processing apparatus according to the claim 1 in which the projective transformation matrix calculating means calculates a projective transformation matrix which projectively transforms the first polygon into a second polygon which is inscribed or circumscribed with an ellipse whose center is a point where the center candidate is projectively transformed.

The invention described in claim 3 is an image processing apparatus in which an ellipse whose center is a point where the center candidate is projectively transformed in the projective transformation matrix calculating means is a circle.

The invention described in claim 4 is the image processing apparatus according to any of claims 1 to 3 in which the polygon calculating means calculates the first polygon whose tangent points are intersection points between a straight line passing through the center candidate and the ellipse.

The invention described in claim 5 is the image processing apparatus according to claim 4 in which the polygon calculating means assumes a straight line parallel to the major axis of the ellipse as a straight line passing through the center candidate.

The invention described in claim 6 is the image processing apparatus according to claim 4 in which the polygon calculating means uses, as the tangent points, points where a straight line parallel to any side of an image frame surrounding the target image is tangent to the ellipse.

The invention described in claim 7 is the image processing apparatus according to any of claims 1 to 6 in which the polygon calculating means calculates a quadrangle associated with the ellipse and the center candidate, and the projective transformation matrix calculating means calculates a projective transformation matrix which projectively transforms the quadrangle into a square associated with an ellipse whose center is a point where the center candidate is projectively transformed.

The invention described in claim 8 is the image processing apparatus according to any of claims 1 to 7 in which the center candidate deciding means extracts a center candidate image including the center candidate from the target image and decides the center candidate from an intersection point between the major axis and the minor axis of an ellipse by which the extracted center candidate image is approximated.

The invention described in claim 9t is the image processing apparatus according to any of claims 1 to 8 in which the target image is a flower image, the ellipse calculating means calculates the ellipse by which the flower image is approximated, and the center candidate deciding means decides the center candidate of the flower image inside of the center of the flower in the flower image.

The invention described in claim 10 is the image processing apparatus according to any of claims 1 to 9 further including an image obtaining means that obtains an image including the target image.

The invention described in claim 11 is the image processing apparatus according to claim 10 further including a target image extracting means that extracts the target image from the obtained image.

The invention described in claim 12 is the image processing apparatus according to any of claims 1 to 11 further including a searching means that searches information for specifying the target image based on the transformation image.

The invention described in claim 13 is the image processing apparatus according to claim 12 in which the searching means extracts a feature quantity of the image from the transformation image and searches information for specifying the target image based on the feature quantity.

The invention described in claim 14 is the image processing apparatus according to any of claims 1 to 13 in which the second polygon is a regular polygon.

The invention described in claim 15 is the image processing apparatus according to any of claims 1 to 14 further including a storing means that stores the target image.

The invention described in claim 16 is an image processing method for performing an image processing for a target image, including an ellipse calculating step of calculating an ellipse by which the target image is approximated, a center candidate deciding step of deciding a center candidate of the target image after the image processing, a polygon calculating step of calculating a first polygon associated with the ellipse and the center candidate, a projective transformation matrix calculating step of calculating a projective transformation matrix which projectively transforms the first polygon into a second polygon associated with an ellipse whose center is a point where the center candidate is projectively transformed, and a transformation image obtaining step of projectively transforming the target image based on the projective transformation matrix and obtaining a transformation image.

The invention described in claim 17 is an image processing program for causing a computer to function as an ellipse calculating means that calculates an ellipse by which the target image e is approximated to be subjected to an image processing, a center candidate deciding means that decides a center candidate of the target image after the image processing, a polygon calculating means that calculates a first polygon associated with the ellipse and the center candidate, a projective transformation matrix calculating means that calculates a projective transformation matrix which projectively transforms the first polygon into a second polygon associated with an ellipse whose center is a point where the center candidate is projectively transformed, and a transformation image obtaining means that projectively transforms the target image based on the projective transformation matrix and obtains a transformation image.

The invention described in claim 18 is a computer-readable recording medium which records an image processing program for causing a computer to function as an ellipse calculating means that calculates an ellipse by which a target image is approximated to be subjected to an image processing, a center candidate deciding means that decides a center candidate of the target image after the image processing, a polygon calculating means that calculates a first polygon associated with the ellipse and the center candidate, a projective transformation matrix calculating means that calculates a projective transformation matrix which projectively transforms the first polygon into a second polygon associated with an ellipse whose center is a point where the center candidate is projectively transformed, and a transformation image obtaining means that projectively transforms the target image based on the projective transformation matrix and obtains a transformation image.

Effect of the Invention

According to the present invention, a target image to be subjected to an image processing is stored, an ellipse by which the target image is approximated is calculated, a center candidate of the target image is decided, a first polygon associated with the ellipse and the center candidate is calculated, a projective transformation matrix for projectively transforming the first polygon into a second polygon associated with an ellipse whose center is a point where the center candidate is projectively transformed is calculated, and the stored target image is projectively transformed based on the projective transformation matrix to obtain a transformation image of the target image, thereby it enables even a target image with no contour of straight line portions to be transformed into an image in a desired orientation.

BRIEF DESCRIPTION OF THE DRAWINGS

FIG. 2 is a block diagram showing an exemplary outline structure of a portable terminal of FIG. 1;

FIG. 12 is schematic diagrams showing how an ellipse is projectively transformed into a circle, where

FIG. 18(A) is a schematic diagram showing an exemplary quadrangle inscribed with an ellipse and FIG. 18(B) is a schematic diagram showing the projectively-transformed quadrangle; and FIG. 19 shows a fourth variant for calculating a quadrangle contacting with an ellipse, where

MODES FOR CARRYING OUT THE INVENTION

A mode for carrying out the present invention will be described below with reference to the drawings.

A schematic structure and functions of an image searching system according to an embodiment of the present invention will be first described with reference to the drawings.

Figure 1:
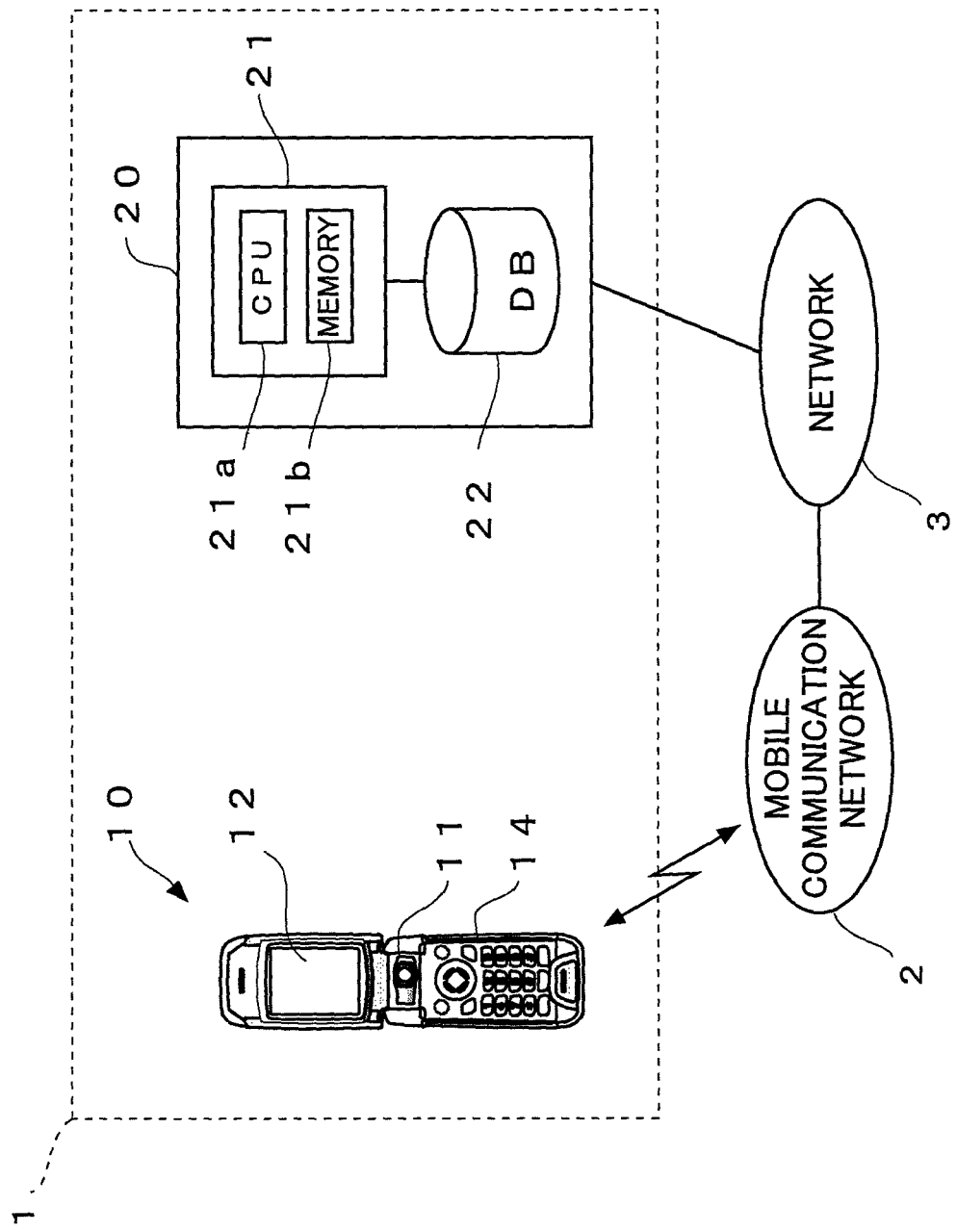
FIG. 1 is a schematic diagram showing an exemplary outline structure of an image searching system according to an embodiment of the present invention.

FIG. 1 is a schematic diagram showing an exemplary outline structure of the image searching system according to the embodiment of the present invention. FIG. 2 is a block diagram showing an exemplary outline structure of a portable terminal of FIG. 1.

As shown in FIG. 1, the image searching system 1 as an exemplary image processing apparatus includes a portable terminal 10 for photographing a shooting target such as portable wireless phone, and an image searching server 20 for making a search based on image data from the portable terminal 10.

As shown in FIG. 2, the portable terminal 10 functioning as an exemplary image processing apparatus has a photographing unit 11 for photographing a shooting target, a display unit 12 for displaying a photographed image or the like, a wireless communication unit 13 for communicating with a wireless base station, an operation unit 14 for inputting numerals or characters, a storage unit 15 for storing photographed images therein, and a control unit 16 for performing various controls on the portable terminal 10, and the units are interconnected via a bus 17.

The photographing unit 11 has a digital camera formed of a CMOS (Complementary Metal Oxide Semiconductor) image sensor or a CCD (charge-coupled device) image sensor.

The display unit 12 is configured of a liquid crystal display device or EL (Electro Luminescence) device.

The wireless communication unit 13 makes communication with the image searching server 20 via a mobile communication network 2 or a network 3 such as Internet.

The operation unit 14 is configured of various keys. A user moves a pointer displayed on the display unit 12, or selects and confirms an image portion by the operation unit 14.

The storage unit 15 has a nonvolatile memory such as RAM (Random Access Memory), ROM (Read Only Memory) or flash memory and forms therein a memory space into which an image processing program is loaded and which holds image data therein.

The control unit 16 has a CPU (Central Processing Unit) and executes an image processing program as a computer.

The image searching server 20 functioning as a computer has a control unit 21 for controlling the entire image searching server 20 and making a calculation for the image processing, and a database 22 in which a database for image search is constructed.

As shown in FIG. 1, the control unit 21 has a CPU 21a for executing computer programs, and a memory 21b such as nonvolatile memory including RAM, ROM or flash memory for storing programs to be executed therein.

The CPU 21a in the control unit 21 searches information from the database 22 in response to a search request transmitted from the portable terminal 10, performs an image processing of searching information from received image data, and manages the database 22.

In the memory 21b, a program for making an image search is developed, the received image data is stored, and a calculation result is temporarily stored.

The database 22 has a hard disk drive or silicon disk, and stores information associated with the feature quantity of an image therein. For example, for a database on flowers, the database 22 stores therein information on flowers' names and scientific names and flowers' image such as image on flowers, leaves and nuts in association with information on flowers' colors, numbers of flower petals and entire shapes of flowers and information on discontinuities of flower petals as the feature quantity required for identifying a flower.

The portable terminal 10 is connected to the mobile communication network 2, the image searching server 20 is connected to the network 3 such as Internet, and the mobile communication network 2 and the network 3 are interconnected via a gateway for converting a protocol or contents-describing language.

An outline principle of the embodiment will be described below with reference to the drawing.

Figure 3A:
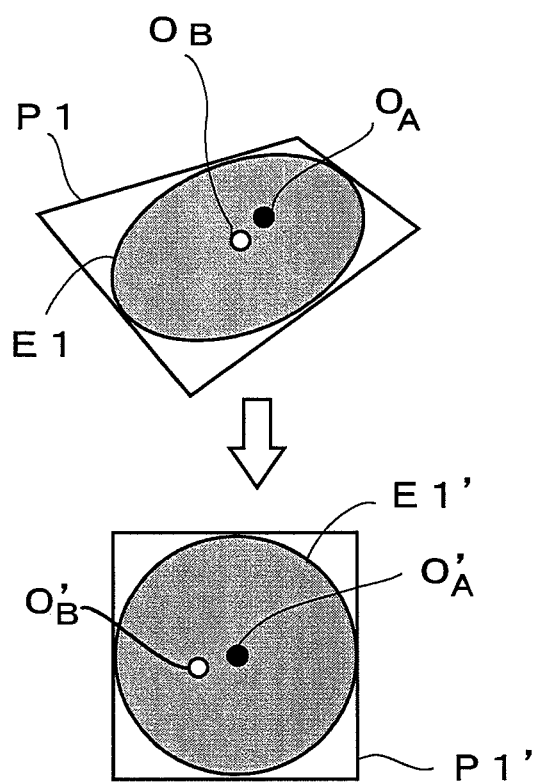
FIG. 3 is a conceptual diagram showing how a subject is projected on a photograph when the subject is photographed from an observation point.
Figure 3B:
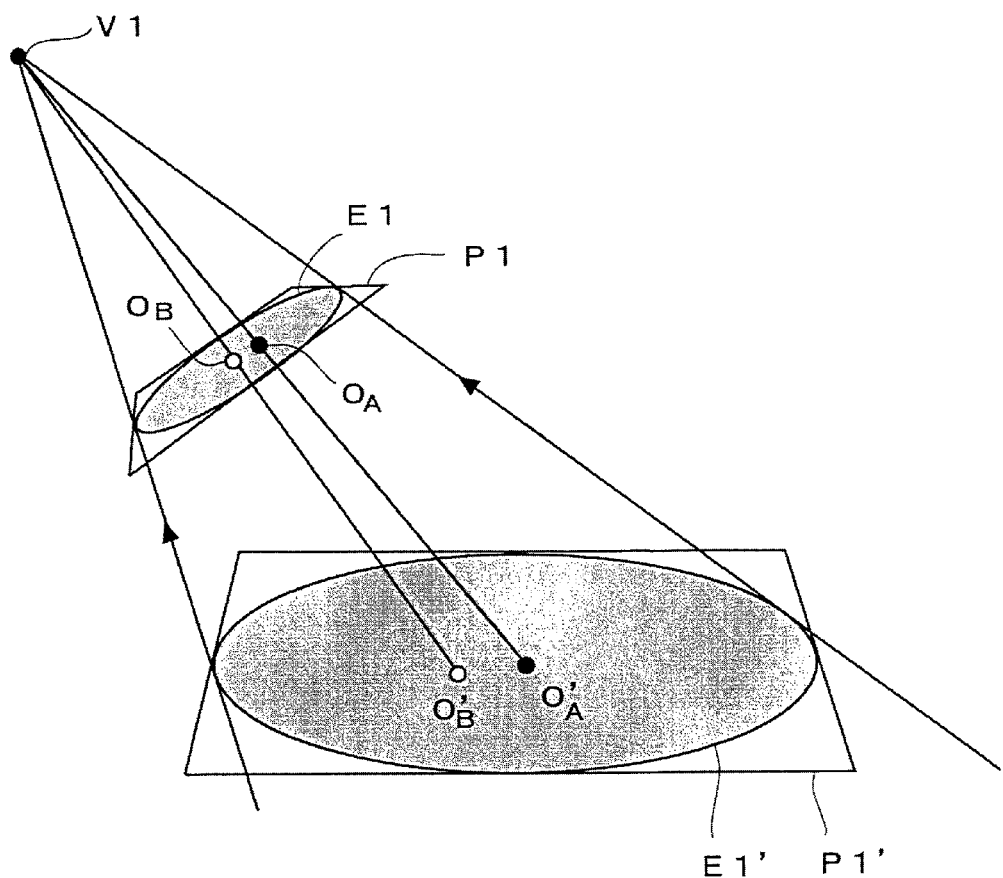

FIG. 3 is a conceptual diagram showing a concept of how a subject is projected on a photograph when the subject is photographed from an observation point V1.

As shown in FIG. 3, image modification is made as if a flower image obliquely photographed from the observation point V1 were seen from the front in a pseudo manner. It is assumed that the subject flower is approximated by an ellipse E1 and is on the plane of a quadrangle P1'.

At first, the entire flower and the center of the flower are extracted from the photographed image, and the respective contour curves are approximated to ellipses for a simplified method. The ellipse to which the entire flower is approximated corresponds to the ellipse E1 and its center is a point $O_B$. The center of the ellipse to which the center of the flower is approximated corresponds to a point $O_A$.

Then, projective transformation is performed in order to obtain an apparent standard image (transformation image) from the front of the flower. When being compared to a photograph, the projective transformation corresponds to photographing an object in a 3D space into a 2D-plane film.

Projection in the reverse direction, that is, from 2D to 3D is typically impossible, but is enabled under some limited conditions. With the method according to the embodiment, assuming that a planar flower is present on a plane in a 3D space (plane including a quadrangle P1), the projective transformation is performed from the 2D plane to the 2D plane. Further, for simplifying the method, it is assumed that the shape of an actual flower can be approximated to a circle E1'. The flower clipped from the input image is approximated to the ellipse E1, and the quadrangle P1 circumscribed with the ellipse E1 is obtained to be an target area to be modified. When the target area to be modified is projectively transformed into the quadrangle P1' as square, the ellipse E1 is projected to the previously-assumed circle E1'. In this way, with the projective transformation, the standard image of the photograph of the flower taken from its front can be obtained in a pseudo manner from the photograph of the flower taken at a tilted angle. The method will be described in detail with the flowcharts.

The standard image (transformation image) is an image transformed to be displayed in a desired orientation. For example, the standard image (transformation image) is an image in which a flower is displayed at such an angle that the center of the flower is near the center of the entire flower, and may be an image viewed at an angle at which a target image such as flower can be easily specified.

The operations of the embodiment will be described below with reference to the drawings.

Figure 4:
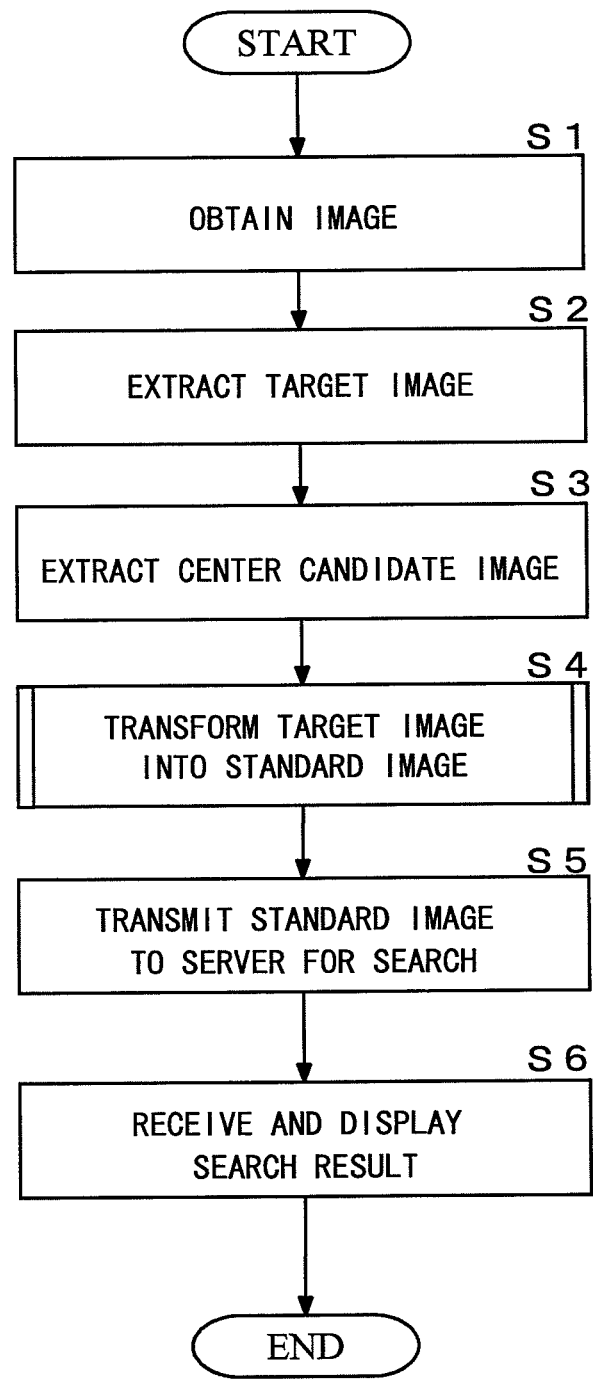
FIG. 4 is a flowchart showing an exemplary image processing by the portable terminal of FIG. 1.
Figure 5A:
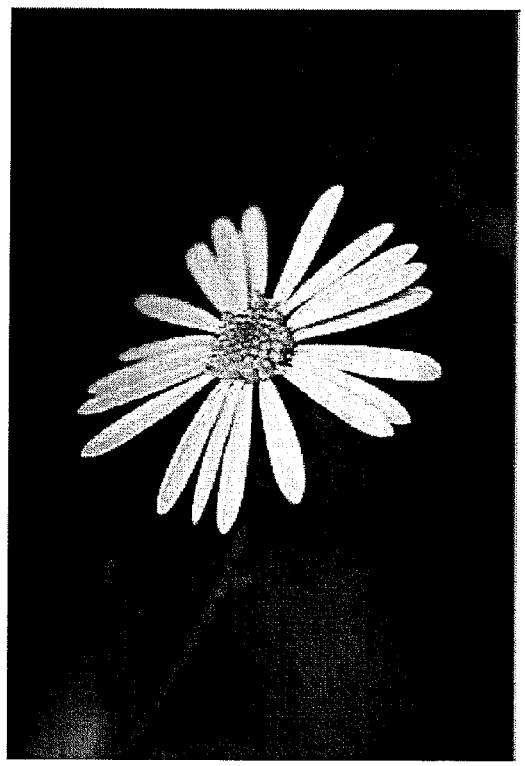
FIG. 5(A) is a schematic diagram showing an exemplary image including a target image.
Figure 5B:
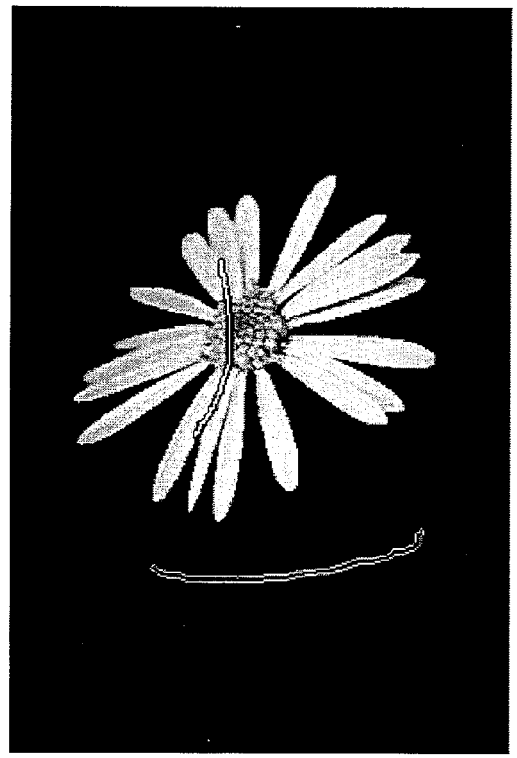
FIG. 5(B) is a schematic diagram showing how the target image extracted from the image is.
Figure 5C:
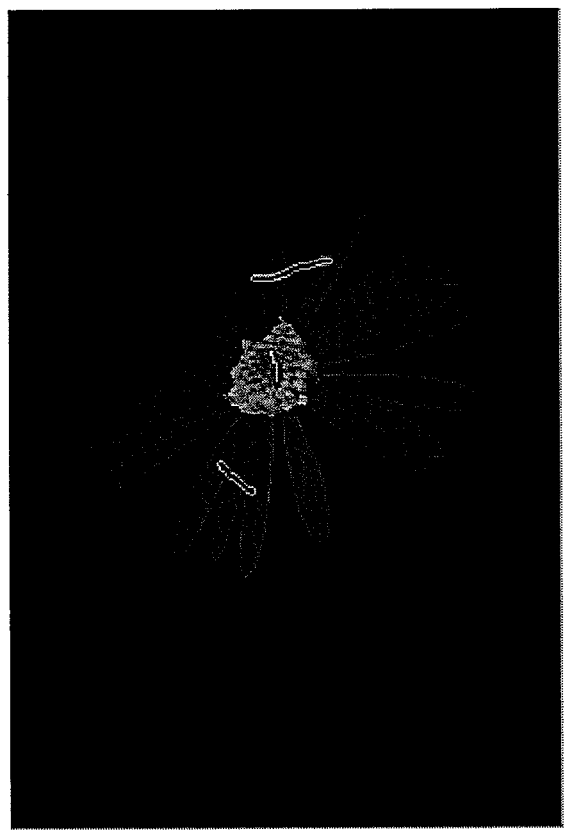
FIG. 5(C) is a schematic diagram showing how a center candidate image including a center candidate is extracted from the target image.
Figure 6:
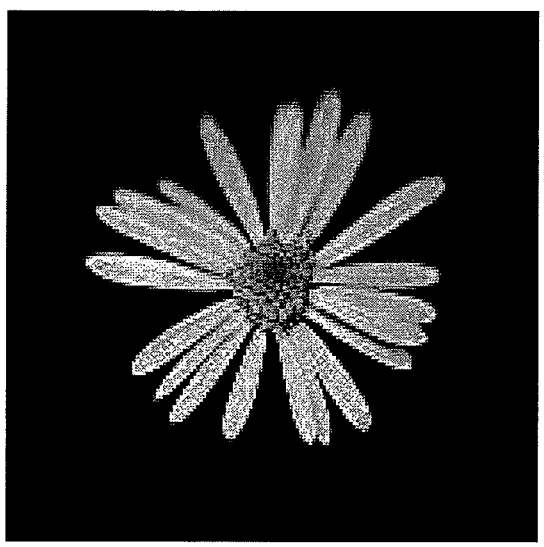
FIG. 6 is a schematic diagram showing an exemplary projectively-transformed target image.

FIG. 4 is a flowchart showing an exemplary image processing by the portable terminal of FIG. 1. FIG. 5(A) is a schematic diagram showing an exemplary image including a target image, FIG. 5(B) is a schematic diagram showing how the target image extracted from the image is, and FIG. 5(C) is a schematic diagram showing how a center candidate image including a center candidate is extracted from the target image. FIG. 6 is a schematic diagram showing an exemplary projectively-transformed target image.

At first, as shown in FIG. 4, the portable terminal 10 obtains an image of a shooting target by the photographing unit 11 (step S1). Specifically, the control unit 16 in the portable terminal 10 obtains an image including a target image (flower image) as shown in FIG. 5(A) from the photographing unit 11, and stores image data of the image in the storage unit 15. In this manner, the portable terminal 10 functions as an exemplary image obtaining means that obtains the image including the target image, and functions as an exemplary storing means that stores therein the target image to be subjected to the image processing. In the image of FIG. 5(A), the subject flower is not photographed from its front.

Then, the portable terminal 10 extracts the target image from the obtained image (step S2). Specifically, the control unit 16 finds the contour of the entire flower and extracts the flower image as shown in FIG. 5(B). In FIG. 5(B), the entire flower characterized by its petals is drawn by the contour curve and its background is made dark. As shown in FIG. 5(B), the user may designate the flower part and the background part by a pointer displayed on the display unit 12 by the operation unit 14, and the control unit 16 may extract the target image based on the information on colors. In this way, the portable terminal 10 functions as an exemplary target image extracting means that extracts the target image from the obtained image.

Specifically, for example, the target image extracting means includes a receiving means that receives, from the user, designations of at least one foreground pixel on a flower portion (foreground area) included in the obtained image and at least one background pixel on the background portion (background area) included in the obtained image, a divided color space specifying means that performs a divided color space specification processing of, with the designated foreground pixel and the designated background pixel as reference pixels, respectively, specifying a divided color space to which each reference pixel belongs as a reference divided color space from among multiple divided color spaces into which a 3D color space is divided, a color distance calculating means that performs a color distance calculation processing of calculating a color distance in a color space between each reference pixel and a neighboring pixel adjacent thereto, belonging a deciding means that performs a belonging decision processing of deciding whether each neighboring pixel belongs to each reference divided color space, a cost calculating means that performs a cost calculation processing of calculating cost of each neighboring pixel, based on the distance between colors calculated for each neighboring pixel and a weight based on the belonging to the reference divided color space decided for each neighboring pixel, and a confirming means that performs a confirmation processing of confirming a neighboring pixel with the lowest calculated cost as the foreground pixel or background pixel, and may cause a computer to repeatedly execute the color distance calculation processing, the belonging decision processing, the cost calculation processing and the confirmation processing with the confirmed neighboring pixel as reference pixel, thereby extracting the foreground area from the obtained image and extracting a target image.

Then, the portable terminal 10 extracts a center candidate image from the target image (step S3). Specifically, as shown in FIG. 5(C), the control unit 16 extracts the contour of the center of the flower as exemplary center candidate image, which is present on the contour of the entire flower. As shown in FIG. 5(C), the user may designate the flower petals and the center of the flower by a pointer displayed on the display unit 12 by the operation unit 14, and the control unit 16 may extract the target image based on the information on colors. In this way, the portable terminal 10 functions as an exemplary center candidate deciding means that extracts, from the target image, the center candidate image which is an image in a predetermined area including the center candidate. The center candidate image is, for example, an image of an area in a target image which includes the center candidate and in which depth or color information is discontinuously different from surroundings.

Then, the portable terminal 10 transforms the target image into the standard image (step S4). Specifically, with the projective transforming method described later, the control unit 16 transforms the target image stored in the storage unit 15 into the standard image which seems to be the flower photographed from its front as shown in FIG. 6. In this way, the portable terminal 10 functions as exemplary standard image obtaining means (transformation image obtaining means) for projectively transforming the target image stored in the storing means based on a projective transformation matrix and obtaining the standard image. The image data of the vicinity including the target image is transformed into the standard image.

Then, the portable terminal 10 transmits the standard image to the image searching server 20 for search (step S5). Specifically, in order to search which a photographed flower is, the control unit 16 transmits the standard image as shown in FIG. 6 to the image searching server 20 from the wireless communication unit 13 via the mobile communication network 2 and the network 3.

Then, the portable terminal 10 receives and displays the search result from the image searching server 20 (step S6).

Specifically, the control unit 16 receives the name of the searched flower and the information on its flower from the image searching server 20 via the wireless communication unit 13, and displays the same on the display unit 12.

A search processing by the image searching server 20 will be described below.

Figure 7:
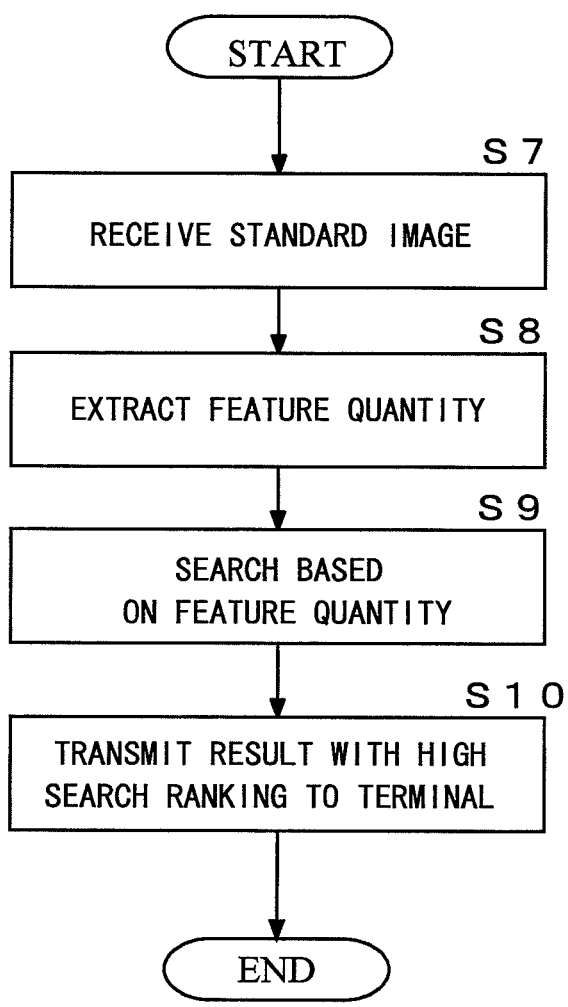
FIG. 7 is a flowchart showing an exemplary search processing in a searching server of FIG. 1.

FIG. 7 is a flowchart showing an exemplary search processing by the image searching server 20.

At first, as shown in FIG. 7, the image searching server 20 receives the standard image from the portable terminal 10 (step S7). Specifically, the control unit 21 in the image searching server 20 receives the standard image from the portable terminal 10 via the mobile communication network 2 and the network 3.

Then, the image searching server 20 extracts a feature quantity from the received standard image (step S8). Specifically, when the target image is a flower image, the control unit 21 extracts the information on the number of flower petals, the flower color and the entire flower shape and the information on the flower petal such as discontinuities of the flower petal, as the feature quantity of the standard image.

Then, the image searching server 20 searches the information for specifying the standard image from the database 22 based on the feature quantity of the extracted standard image (step S9). Specifically, the control unit 21 searches a similar flower from the database 22 based on the feature quantity of the standard image of the flower, and finds the information on flowers having a higher similarity and images of the flowers. In this way, the image searching server 20 functions as an exemplary searching means that searches the information for specifying the target image based on the standard image. The image searching server 20 functions as an exemplary searching means that extracts a feature quantity of the image from the standard image and searching the information for specifying the target image based on the feature quantity.

Then, the image searching server 20 transmits the results with a high search ranking to the portable terminal 10 (step S10). Specifically, the control unit 21 transmits the information on flowers or the images of the flowers.

In this way, the image searching server 20 functions as an exemplary searching means that searches the information for specifying the target image based on the standard image. The image searching server 20 functions as an exemplary searching means that extracts a feature quantity of the image from the standard image and searching the information for specifying the target image based on the feature quantity.

The portable terminal 10 may include a database like the database 22 of the image searching server 20, and may search the information on the image from the standard image.

A subroutine of step S4 for transforming the target image into the standard image will be described below in detail with reference to the drawings.

Figure 8:
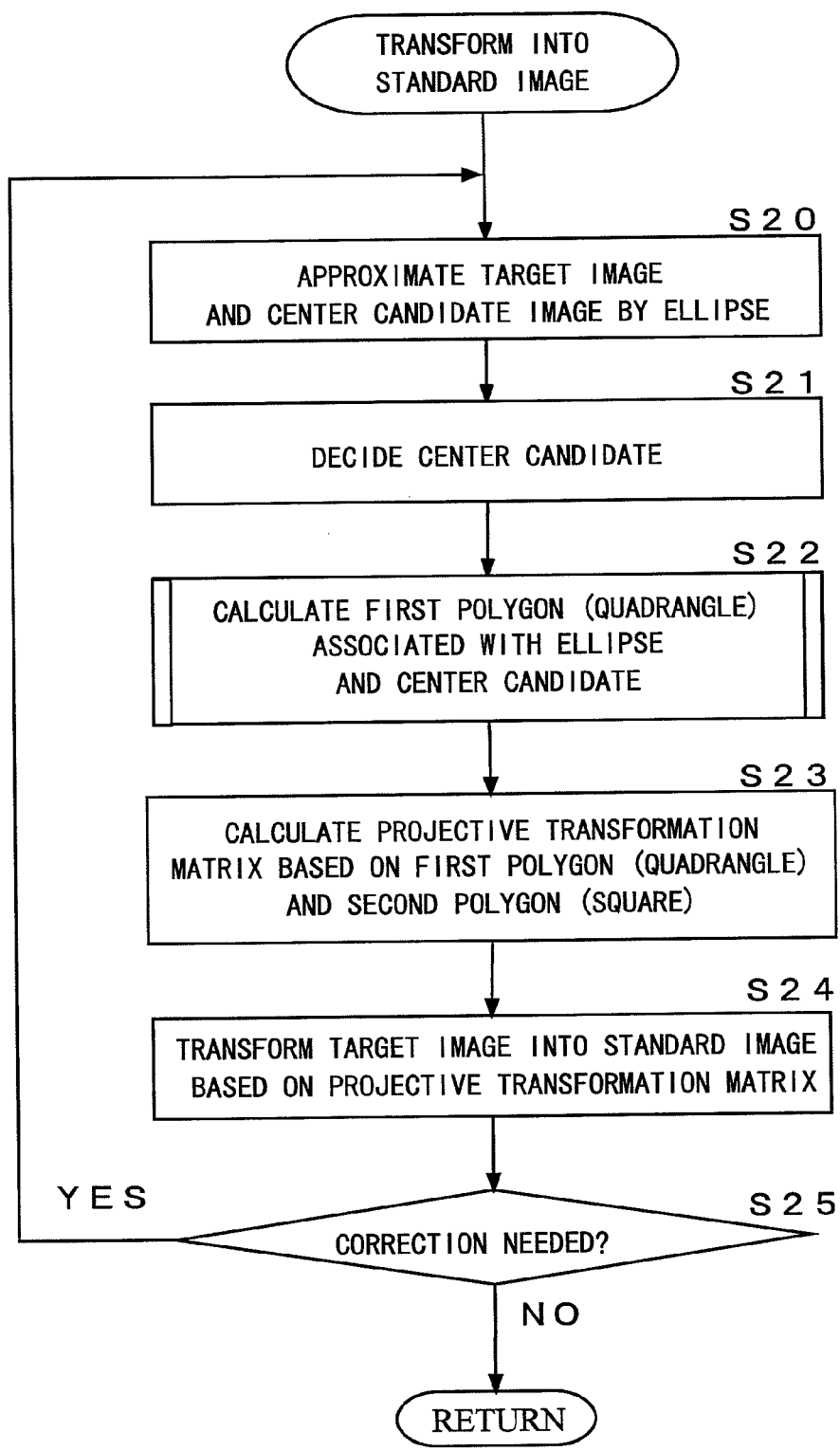
FIG. 8 is a flowchart showing an exemplary subroutine of transformation into a standard image in the flowchart of FIG. 4.
Figure 9A:
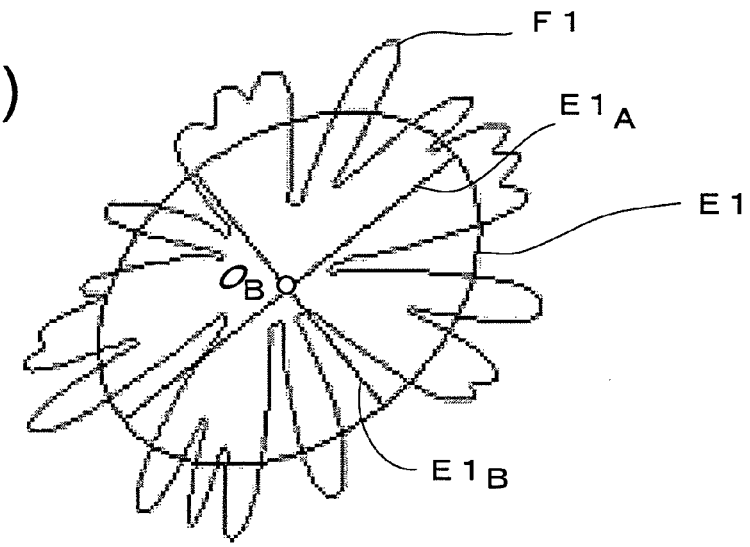
FIG. 9(A) is a schematic diagram showing an exemplary contour of the target image of FIG. 5 and an exemplary ellipse by which the target image is approximated.
Figure 9B:
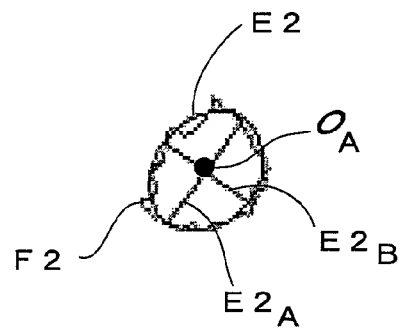
FIG. 9(B) is a schematic diagram showing an exemplary center candidate image including a center candidate extracted from the target image and an exemplary ellipse by which the center candidate image is approximated.
Figure 10:
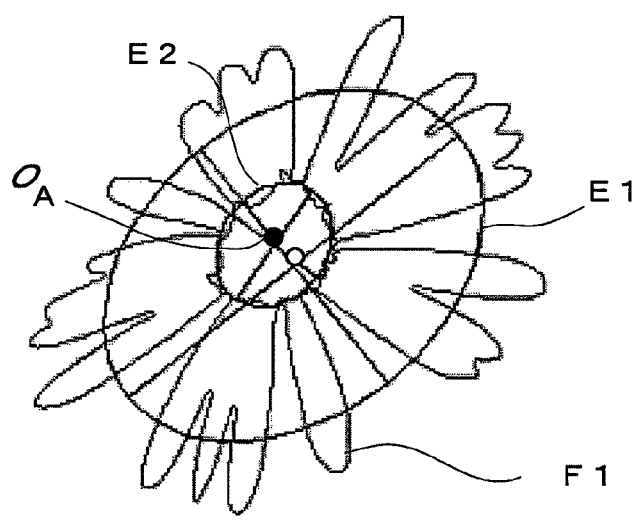
FIG. 10 is a schematic diagram showing a relationship between the ellipse of FIG. 9(A) and the ellipse of FIG. 9(B)
Figure 11:
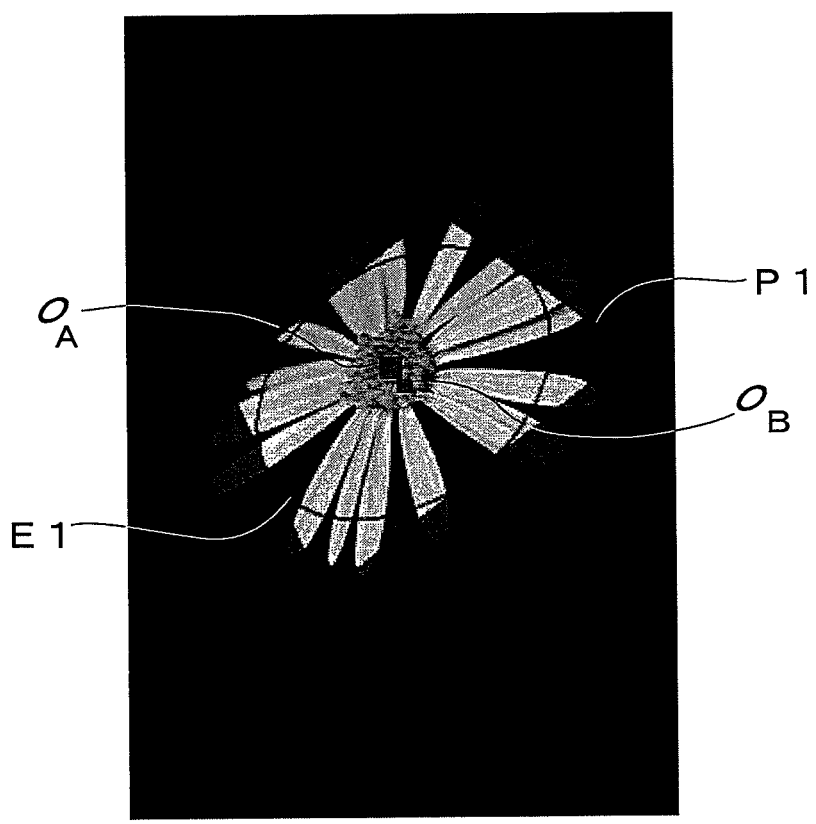
FIG. 11 is a schematic diagram showing a relationship between the target image of FIG. 5 and a quadrangle contacting with an ellipse.
Figure 12A:
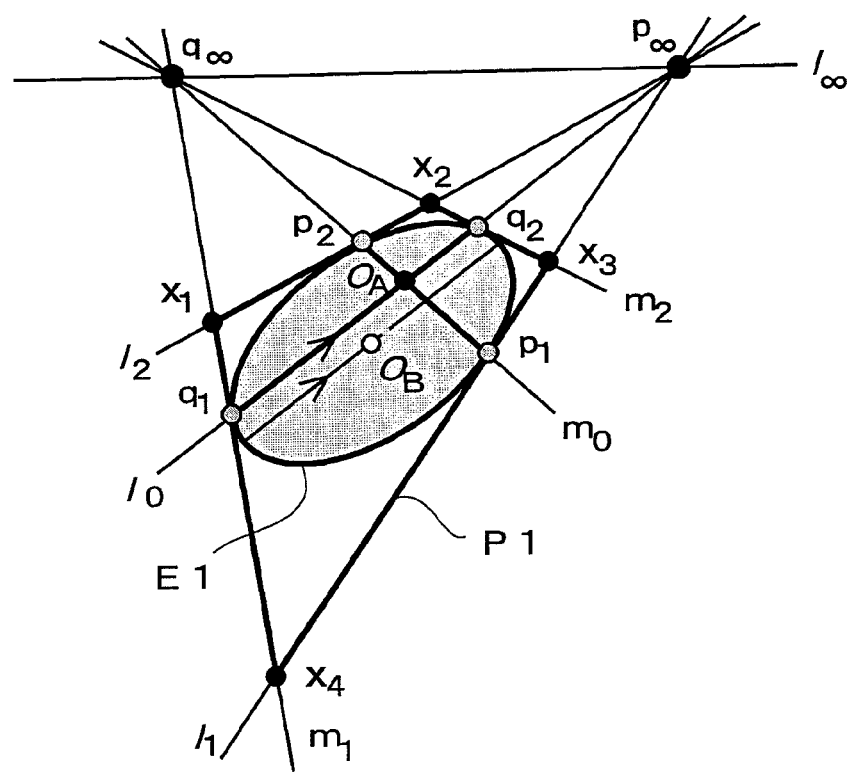
FIG. 12(A) is a schematic diagram showing a quadrangle contacting with an ellipse and FIG. 12(B) is a schematic diagram showing the projectively-transformed quadrangle.
Figure 12B:
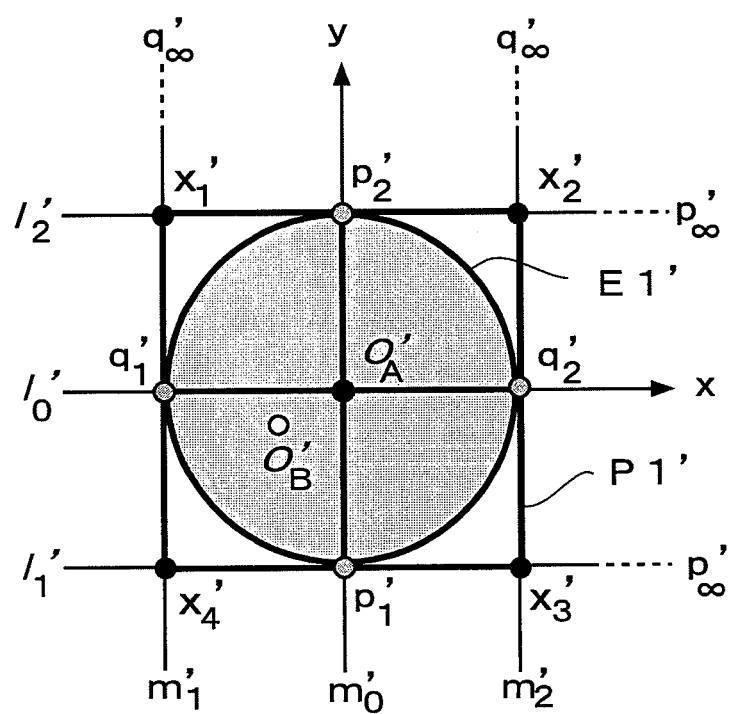

FIG. 8 is a flowchart showing an exemplary subroutine for transformation into the standard image in the flowchart of FIG. 4. FIG. 9(A) is a schematic diagram showing the contour of the target image of FIG. 5 and an exemplary ellipse by which the target image is approximated, and FIG. 5(B) is a schematic diagram showing a center candidate image including a center candidate extracted from the target image and an exemplary ellipse by which the center candidate image is approximated. FIG. 10 is a schematic diagram showing a relationship between the ellipse of FIG. 9(A) and the ellipse of FIG. 9(B). FIG. 11 is a schematic diagram showing a relationship between the target image of FIG. 5 and a quadrangle contacting with the ellipse. FIG. 12 is schematic diagrams showing projective transformation from an ellipse into a circle, where FIG. 12(A) is a schematic diagram showing a quadrangle contacting with an ellipse and FIG. 12(B) is a schematic diagram showing the projectively-transformed quadrangle.

At first, the portable terminal 10 performs ellipse approximation on the target image and the center candidate image (step S20). Specifically, the control unit 16 approximates the contour F1 of the entire flower extracted in step S2 to the ellipse E1 by least square as shown in FIG. 9(A), and approximates the contour F2 of the center of the flower extracted in step S3 to an ellipse E2 by least square as shown in FIG. 9(B). In this way, the portable terminal 10 functions as an exemplary ellipse calculating means that calculates the ellipse by which the target image is approximated. The ellipse approximation will be described later.

Then, the portable terminal 10 decides the center candidate (step S21). Specifically, the control unit 16 decides the center candidate $O_A$ from the intersection point between the major axis $E2_A$ and the minor axis $E2_B$ of the ellipse E2 by which the center of the flower is approximated as shown in FIG. 9(B). The center candidate $O_A$ is information on depth. The relationship between the ellipse E1 of the entire flower and the ellipse E2 of the center of the flower is as shown in FIG. 10. In this way, the portable terminal 10 functions as an exemplary center candidate deciding means that decides the center candidate of the target image. The portable terminal 10 functions as an exemplary center candidate deciding means that decides the center candidate from the intersection point between the major axis and the minor axis of the ellipse by which the extracted center candidate image is approximated. The portable terminal 10 functions as an exemplary ellipse calculating means that calculates the ellipse whose target image is a flower image and by which the flower image is approximated. The portable terminal 10 functions as an exemplary center candidate deciding means that decides the center candidate of the flower image inside of the center of the flower whose target image is the flower image.

Then, the portable terminal 10 calculates a quadrangle associated with the ellipse and the center candidate (step S22). Specifically, as shown in FIG. 11, the control unit 16 calculates the quadrangle P1 as an exemplary first polygon contacting with the ellipse E1 from the ellipse E1 of the entire flower and the center candidate $O_A$ of the ellipse E2 of the center of the flower. In this way, the portable terminal 10 functions as an exemplary polygon calculating means that calculates the first polygon associated with the ellipse and the center candidate. The portable terminal 10 functions as an exemplary polygon calculating means that calculates the quadrangle associated with the ellipse and the center candidate.

Then, the portable terminal 10 calculates a projective transformation matrix based on the quadrangle as an exemplary first polygon and a square as an exemplary second polygon (step S23). Specifically, as shown in FIGS. 12(A) and 12(B), the control unit 16 calculates the projective transformation matrix based on the vertexes x2, x2, x3, x4 of the quadrangle P1 as the first polygon and the vertexes x2', x2', x3', x4' of the square P1' as an exemplary second polygon. In this way, the portable terminal 10 functions as an exemplary projective transformation matrix calculating means that calculates the projective transformation matrix which projectively transforms the first polygon into the second polygon associated with the ellipse whose center is a point where the center candidate is projectively transformed. The portable terminal 10 functions as the projective transformation matrix calculating means that calculates the projective transformation matrix which projectively transforms the quadrangle into the square associated with the ellipse whose center is a point where the center candidate is projectively transformed. The second polygon is a regular polygon, for example. The center of the second polygon is the center of gravity, the incenter or the circumcenter of the second polygon as regular polygon, for example. In the embodiment, a square is employed as the second polygon. In the embodiment, the square P1' as the second polygon is circumscribed with the ellipse (the circle in the embodiment) E1' whose center is a point where the center candidate is projectively transformed. The center of the ellipse is the intersection point between the major axis and the minor axis of the ellipse. The ellipse includes a circle in which the length of the major axis is the same as the length of the minor axis. The projective transformation matrix will be described later.

Then, the portable terminal 10 transforms the target image into the standard image based on the projective transformation matrix (step S24). Specifically, the control unit 16 transforms each pixel of the image data of the target image stored in the storage unit based on the projective transformation matrix for transforming the quadrangle P1 (x1, x2, x3, x4) into the square P1' (x1', x2', x3', x4').

Then, the portable terminal 10 decides whether the standard image needs to be corrected (step S25). Specifically, the control unit 16 decides whether the standard image needs to be corrected based on an error between the ellipse approximation and the contour of the entire flower, a distortion of the standard image or a distortion of the center of the flower in the standard image. When the standard image needs to be corrected in a person's point of view, the control unit 16 receives an input from the operation unit 14 and decides whether the standard image needs to be corrected. When correction is needed (step S25; YES), the control unit 16 returns to step S20 to adjust the shape of the ellipse and the position of the center candidate. On the other hand, when correction is not needed (step S25; NO), the control unit 16 terminates the subroutine.

The ellipse approximation will be described herein. It will be described by way of a conic curve (quadric curve) which is a generalized ellipse.

The quadric curve can be indicated by the following equation using the coefficients A to F.

$$Ax^2 + 2Bxy + Cy^2 + 2Dx + 2Ey + F = 0 \quad (1)$$

In particular, when $AC - B^2 > 0$ is met, the ellipse is indicated. When the equation is replaced by use of the vectors v and c, the equation (1) is written into the following equations.

$$v^T c = 1 \quad (2)$$

$$c = -1/F [A, 2B, C, 2D, 2E]^T \quad (3)$$

$$c = [x2, xy, y2, x, y]^T \quad (4)$$

When a string of N(=5) points $(x_i, y_i)$ (i=1 ... N) is given on the plane, the quadric curve by which the points are approximated leads to the following simultaneous equations with five unknowns by use of the matrix $V = [v_1, \ldots, v_N]$ in which N vectors v are bundled.

$$Vc = 1 \quad (5)$$

In the case of N>5, over-determined system simultaneous equations are caused and their solutions are not uniquely found, and thus approximation is performed by least square. In order to minimize a residual between Vc made of the given string of points and 1 in the right side, the following equation (6) is solved and thus the approximation solution c~ as indicated in the equation (7) is obtained.

$$\partial/\partial c |Vc - 1|^2 = 0 \quad (6)$$

$$c\sim = (V^T V)^{-1} V^T = V + 1 \quad (7)$$

V+ is called pseudo inverse matrix.

The projective transformation matrix and the quadric curve projective transformation will be described below with reference to the drawings.

Figure 13A:
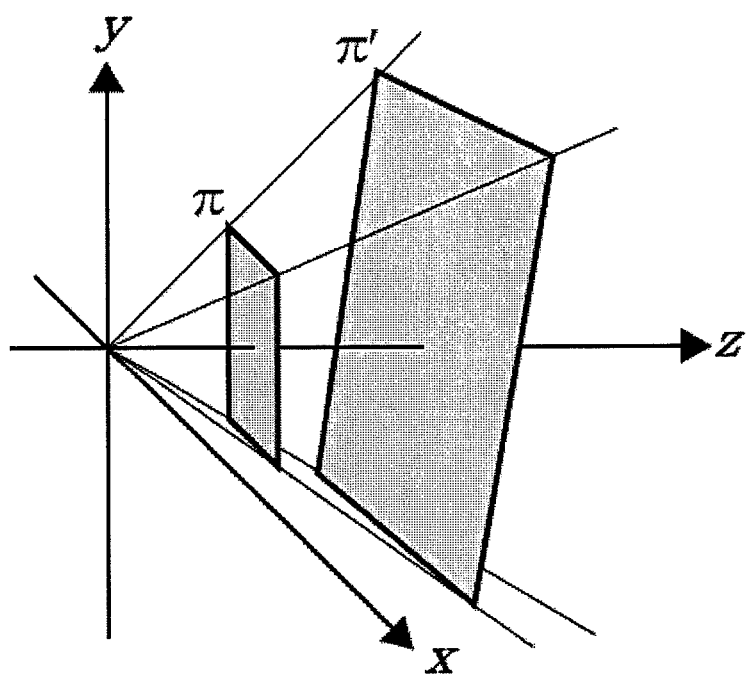
FIG. 13(A) is a schematic diagram showing a plane for explaining a projective transformation matrix.
Figure 13:
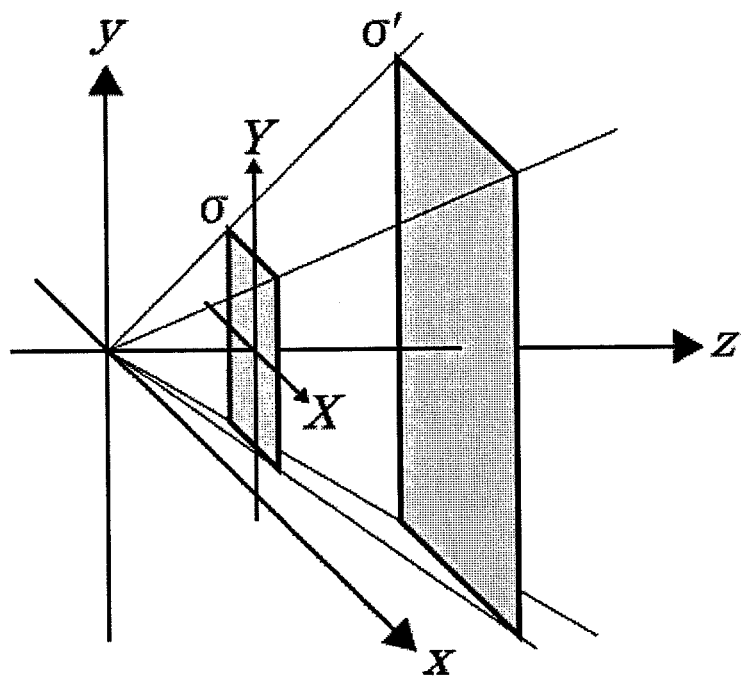
FIG. 13(B) is a schematic diagram showing a plane for explaining projective transformation in quadric curve.

In FIG. 13, FIG. 13(A) is a schematic diagram showing a plane for explaining the projective transformation matrix and FIG. 13(B) is a schematic diagram showing a plane for explaining the quadric curve projective transformation.

As shown in FIG. 13(A), two arbitrary planes are taken in the space and the point x=(x, y) on the plane π is assumed to be projected to the point x'=(x', y') on the plane π' with the origin as observation point.

By use of a coefficient $a_{ij}$ (i, j=1, 2, 3), the following equation is established for the coordinates x and x' corresponding to the same point.

[Formula 1]

The respective equations in the formula can be reduced with an arbitrary constant and are each made of an independent 8-coefficient. Thus, an arbitrary coefficient can be fixed and $a_{33} = 1$ is assumed herein. The 8-coefficient $a_{ij}$ can be uniquely found from the four sets of coordinates $x_k, x_k'$ (k=1, 2, 3, 4) corresponding to the same point. This means that a quadrangular area made of $x_k$ on the plane π is projectively transformed into a quadrangular area made of $x_k'$ on the plane π'. The eight points' coordinates are substituted into the equation (8) to solve the equation (8), thereby defining the projective transformation matrix P from the coefficients in the following.

[Formula 2]

The quadric curve projective transformation will be described below.

When the pairs of three numbers $\{X_1, X_2, X_3\}$ and $\{kX_1, kX_2, kX_3\}$ (k≠0) represent the same coordinate, this is called homogeneous coordinate. In FIG. 13(B), it corresponds to the projection from the xy coordinate on the plane σ into the XY coordinate on the plane σ'. The point x and its corresponding point X of homogenous coordinate meet the following relationships.

$$X = [X_1, X_2, X_3]^T \quad (10)$$

$$x = [X_1/X_3, X_2/X_3]^T \quad (11)$$

By use of the homogeneous coordinate, the quadric curve in the equation (1) can be rewritten into the following equation.

$$AX_1^2 + 2BX_1X_2 + CX_2^2 + 2DX_1X_3 + 2EX_2X_3 + FX_3^2 = 0 \quad (12)$$

The matrix Q is defined by the coefficients A to F as follows.

[Formula 3]

With Formula 3 and the equation (10), the equation (12) can be further rewritten into the following equation.

$$X^T Q X = 0 \quad (14)$$

Assuming that the inverse matrix of the projective transformation matrix is $P' = P^{-1}$, the projective transformation from the point X on the homogeneous coordinate into X' and the inverse projective transformation are represented based on the equations (8), (9) and (10) by the following equations.

$$X' = PX \quad (15)$$

$$X = P'X' \quad (16)$$

When the equation $X'^T(P'^T Q P') X' = 0$ obtained by substituting the equation (16) into the equation (14) is replaced with $Q' = P'^T Q P'$, the equation $X'^T Q' X' = 0$ symmetric to the equation (14) is obtained. The equation used for the replacement represents that Q' results from the projective transformation of Q.

Thus, the projective transformation and the inverse projective transformation by P of the quadric curve Q can be represented with the following equations by use of the projective transformation matrix, respectively.

$$Q = P^T Q' P \quad (17)$$

$$Q' = P'^T Q P' \quad (18)$$

Therefore, it is demonstrated that the quadric curve can keep its nature even when the projective transformation is applied thereto.

The subroutine for calculating a quadrangle will be described below in detail with reference to the drawing.

Figure 14:
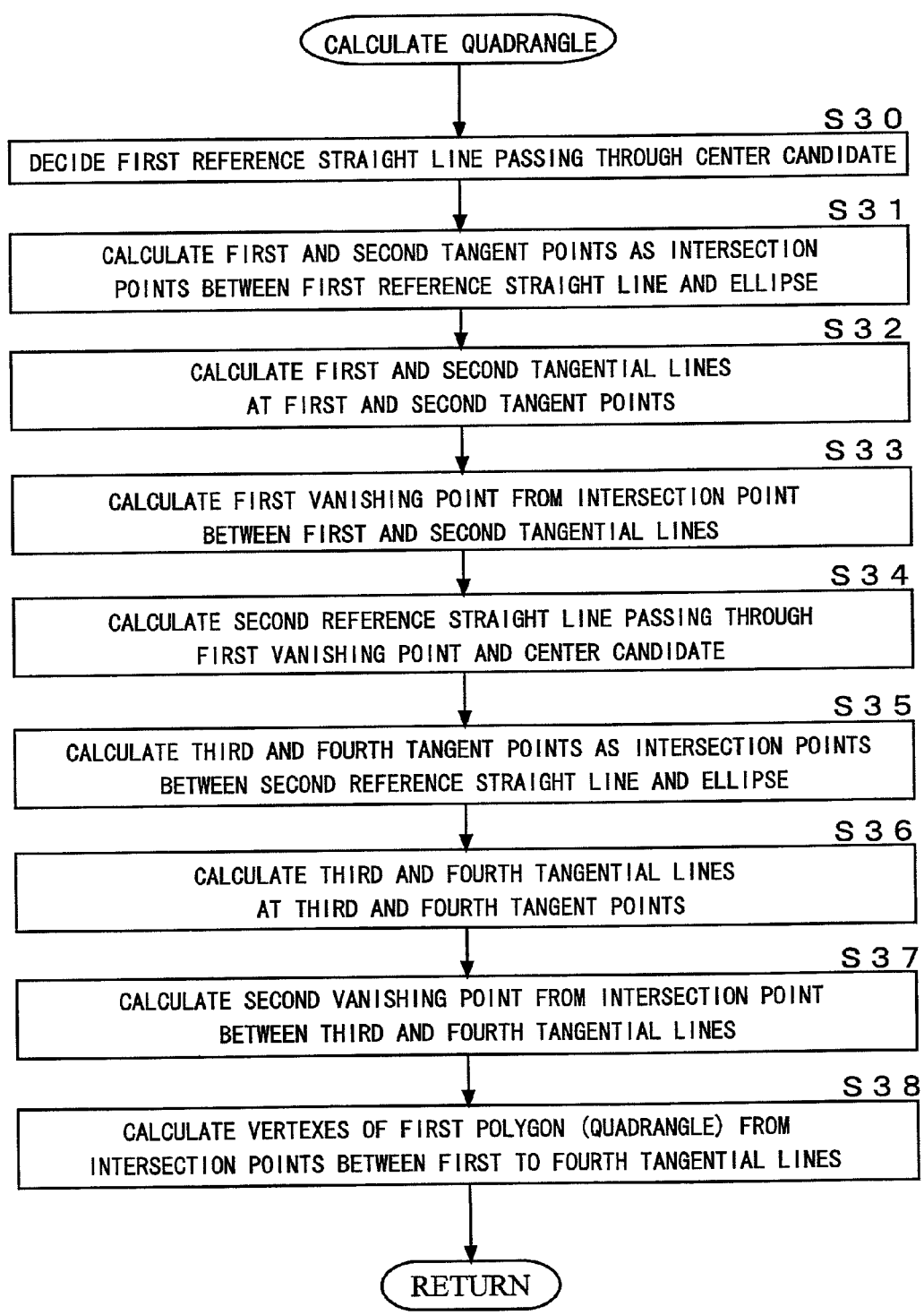
FIG. 14 is a flowchart showing an exemplary subroutine for calculating a quadrangle in the flowchart of FIG. 8.

FIG. 14 is a flowchart showing an exemplary subroutine for calculating a quadrangle in the flowchart of FIG. 8. For the subroutine, it is assumed that the target of the projective transformation is limited to an ellipse in the quadric curve and the virtual quadrangle (target area to be modified) P1 obtained from the ellipse E1 is projectively transformed into the square P1' with which the circle E1' is inscribed. In other words, the projective transformation from the ellipse E1 into the circle E1' is assumed.

The subroutine calculates the quadrangle P1 in the target area to be modified by the following method.

As shown in FIG. 14, the portable terminal 10 first decides a first reference straight line passing through the center candidate (step S30). Specifically, the control unit 16 in the portable terminal 10 decides an arbitrary straight line passing through the center candidate $O_A$, for example, the first reference straight line $l_0$ parallel to the major axis $E1_A$ of the ellipse E1 relative to the ellipse E1 and its inner point (center candidate) $O_A$ as shown in FIG. 12(A). In this way, the portable terminal 10 functions as an exemplary polygon calculating means that assumes a straight line parallel to the major axis of the ellipse as the straight line (the first reference straight line $l_0$) passing through the center candidate.

Then, the portable terminal 10 calculates a first tangent point and a second tangent point from the intersection points between the first reference straight line and the ellipse (step S31). Specifically, the control unit 16 calculates the first tangent point $q_1$ and the second tangent point $q_2$ from the intersection points between the first reference straight line $l_0$ and the ellipse E1.

Then, the portable terminal 10 calculates a first tangential line at the first tangent point and a second tangential line at the second tangent point (step S32). Specifically, the control unit 16 calculates the first tangential line $m_1$ of the ellipse E1 at the first tangent point $q_1$ and the second tangential line $m_2$ of the ellipse E1 at the second tangent point $q_2$.

Then, the portable terminal 10 calculates a first vanishing point from the intersection point between the first tangential line and the second tangential line (step S33). Specifically, the control unit 16 calculates the first vanishing point $q_\infty$ from the intersection point between the first tangential line $m_1$ and the second tangential line $m_2$. The first vanishing point $q_\infty$ is called pole and the reference straight line $l_0$ is called polar line, which are in a dual relationship in which one of them is defined and thereby the other is defined.

Then, the portable terminal 10 calculates a second reference straight line passing through the first vanishing point and the center candidate (step S34). Specifically, the control unit 16 calculates the second reference straight line $m_0$ as the polar line passing through both the first vanishing point $q_\infty$ and the center candidate $O_A$.

Then, the portable terminal 10 calculates third and fourth tangent points from the intersection points between the second reference straight line and the ellipse (step S35). Specifically, the control unit 16 calculates the third tangent point $p_1$ and the fourth tangent point $p_2$ from the intersection points between the second reference straight line $m_0$ and the ellipse E1.

Then, the portable terminal 10 calculates a third tangential line at the third tangent point and a fourth tangential line at the fourth tangent point (step S36). Specifically, the control unit 16 calculates the third tangential line $l_1$ of the ellipse E1 at the third tangent point $p_1$ and the fourth tangential line $l_2$ of the ellipse E1 at the fourth tangent point $p_2$.

Then, the portable terminal 10 calculates a second vanishing point from the intersection point between the third tangential line and the fourth tangential line (step S37). Specifically, the control unit 16 calculates the second vanishing point $p\infty$ of the pole from the intersection point between the third tangential line $l_1$ and the fourth tangential line $l_2$.

Then, the portable terminal 10 calculates the vertexes of the quadrangle from the intersection points between the first to fourth tangential lines (step S38). Specifically, the control unit 16 calculates the intersection point $x_1$ between the first tangential line $m_1$ and the fourth tangential line $l_2$, the intersection point $x_2$ between the fourth tangential line $l_2$ and the second tangential line $m_2$, the intersection point $x_3$ between the second tangential line $m_2$ and the third tangential line $l_1$, and the intersection point $x_4$ between the third tangential line $l_1$ and the second tangential line $m_1$, and assumes the intersection points as the vertexes of the quadrangle P1. The quadrangle P1 surrounded by the first to fourth tangential lines is the target area to be modified, and is an exemplary first polygon with the intersection points between the straight lines passing through the center candidate and the ellipse as tangent points. In this way, the portable terminal 10 functions as an exemplary polygon calculating means that calculates the quadrangle as an exemplary first polygon with the intersection points between the straight lines passing through the center candidate and the ellipse as tangent points.

The control unit 16 calculates the projective transformation matrix P from the coordinates of the vertexes x1 to x4 of the quadrangle P1 shown in FIG. 12(A) and the coordinates of the vertexes x1' to x4' of the square P1' shown in FIG. 12(B) in step S23 after the subroutine. With the projective transformation matrix P, the ellipse E1 is projectively transformed into the circle E1' as an exemplary standard image and at the same time the center candidate $O_A$ is projected onto the center $O_A'$ of the circle.

By use of the coordinate of the center of the flower positioned at the center of the flower, the center candidate $O_A$ can be appropriately taken. Thus, the quadrangle P1 in the target area to be modified is obtained from the ellipse E1 approximated from the entire flower and the center coordinate (the coordinate of the center candidate $O_A$) of the ellipse approximated from the center of the flower, and is projectively transformed into the square P1' so that the front view is obtained.

In this way, according to the embodiment, the portable terminal 10 stores the target image to be subjected to the image processing in the storage unit 15, calculates the ellipse E1 by which the target image (such as the contour F1 of the entire flower) is approximated, decides the center candidate $O_A$ of the target image, calculates the first polygon (such as the quadrangle P1) associated with the ellipse and the center candidate, calculates the projective transformation matrix P for projectively transforming the first polygon into the second polygon (such as the square P1') associated with the ellipse whose center is a point where the center candidate is projectively transformed, and projectively transforms the target image stored in the storage unit 15 based on the projective transformation matrix thereby obtaining the transformation image of the target image so that even a target image having no contour of straight line portions such as flower can be transformed into an image displayed in a desired orientation.

The portable terminal 10 can transform the subject into the standard image which seems to be photographed from its front, that is, an image displayed in a desired orientation, and thus the user does not need to take into consideration the shooting angle, thereby alleviating a user's load. For example, conventionally, when the subject is a flower, in order to adjust the orientation or shape of the flower, or automatically to remove an unwanted background, the user put the flower on the black background or photographed the flower from its front over the entire screen. Thus, the user's load such as adjustment of angle during shooting was heavy. Since there are many flowers that are not easily photographed in mountain, in the related art, a previously-taken photograph was not be able to be corrected into an image displayed in a desired orientation. However, according to the embodiment, even a subject with no straight line portion can be transformed into an image which seems to be photographed from its front.

Since the portable terminal 10 can change the orientation displayed in the photographed image after shooting, the user can photograph the subject without the need of taking into consideration the reflection of illumination, thereby enhancing user's convenience.

When searching which was photographed outside on site, various target images are present due to a shooting angle of a shooting target and thus the searching is difficult to make unlike keyword search. To the contrary, according to the embodiment, when the information on the target image is searched based on the target image, the target image is transformed into an image which seems to be photographed from its front and the searching is made based on the transformation image, thereby facilitating the searching by the standardized feature quantity and enhancing the search speed and the search accuracy.

According to the embodiment, there can be constructed a database for search which is associated with only the images whose display directions are specified as front image, and the image data in which a subject is photographed at various angles does not need to be previously prepared, thereby easily constructing and simplifying the database. Therefore, the portable terminal 10 may include the database for search.

When calculating the first polygon (such as the quadrangle P1) contacting with the intersection points $q_1$, $q_2$, $p_1$, $p_2$ between the straight lines $l_0$, $m_0$ passing through the center candidate $O_A$ and the ellipse E1 as the polygon calculating means, the portable terminal 10 can easily and uniquely calculate the first polygon associated with the ellipse and the center candidate, thereby deciding the projective transformation matrix from the coordinates of the vertexes of the first polygon.

When the portable terminal 10 can function as the polygon calculating means which assumes a straight line parallel to the major axis E1A of the ellipse as the straight line $l_0$ passing through the center candidate $O_A$, the portable terminal 10 can compute the standard image with less distortion and the transformed image can be easily viewed. Because of the standard image with less distortion, the search accuracy is also enhanced.

When calculating the quadrangle P1 associated with the ellipse E1 and the center candidate $O_A$ as the polygon calculating means and calculating the projective transformation matrix for projectively transforming the quadrangle into the square P1' associated with the circle E1' whose center is the center candidate $O_A'$ corresponding to the center candidate $O_A$ as the projective transformation matrix calculating means, the portable terminal 10 can easily calculate the four coordinates for computing the projective transformation matrix from the vertexes of the quadrangle P1.

When extracting the center candidate image including the center candidate (the center of the flower) from the target image such as the entire flower image and deciding the center candidate from the intersection point (point $O_A$) between the major axis $E2_A$ and the minor axis $E2_B$ of the ellipse E2 by which the extracted center candidate image is approximated as the center candidate deciding means, the portable terminal 10 can objectively obtain the information on depth from the center candidate and can obtain the standard image closer to the image photographed from its front.

Assuming that the target image is a flower image (the contour F1 of the flower), when calculating the ellipse E1 by which the flower image is approximated as the ellipse calculating means and deciding the center candidate $O_A$ of the flower image inside of the center of the flower of the flower image (the contour F2 of the center of the flower) as the center candidate deciding means, the portable terminal 10 can obtain the standard image of the flower such as the front image in which the flower is viewed from its pistil even when the image is limited in shooting place or angle. The portable terminal 10 can specify the kind of the flower or the like from the standard image of the flower.

When including the photographing unit 11 as an exemplary image obtaining means that obtains the image including the target image, the portable terminal 10 can photograph the target image such as flower away from home such as in mountain, and can obtain the standard image in which the front image of the flower is displayed in a desired orientation on site, thereby easily specifying the target image, for example, specifying the kind of the flower.

When including the target image extracting means that extracts the target image from the obtained image as in step S2, the portable terminal 10 can separate the background image and the target image and remove an influence of the background image, thereby obtaining the standard image with good accuracy and enhancing the search accuracy based on the standard image. When extracting the target image based on the information on the flower parts and the background color, the user can photograph the target image without the need of taking into consideration the contrast and the portable terminal 10 can alleviate the user's load during the photographing.

When searching the information for specifying the target image based on the standard image transmitted from the portable terminal 10, the image searching server 20 can search the information on the images also in mountain in response to the reception of the search result by the portable terminal 10, and can construct the system capable of easily searching the information on the flower from the photographs of the flowers taken in mountain, for example. Since the target image is specified based on the standard image which seems to be photographed from its front, for example, the searching can be made by the standardized feature quantity, thereby enhancing the search speed and the search accuracy or simplifying the database.

When extracting the feature quantity of the image from the standard image and searching the information for specifying the target image based on the feature quantity as the searching means, the image searching server 20 can enhance the search accuracy.

A first variant for calculating a quadrangle in a target area to be modified will be described below with reference to the drawings.

Figure 15:
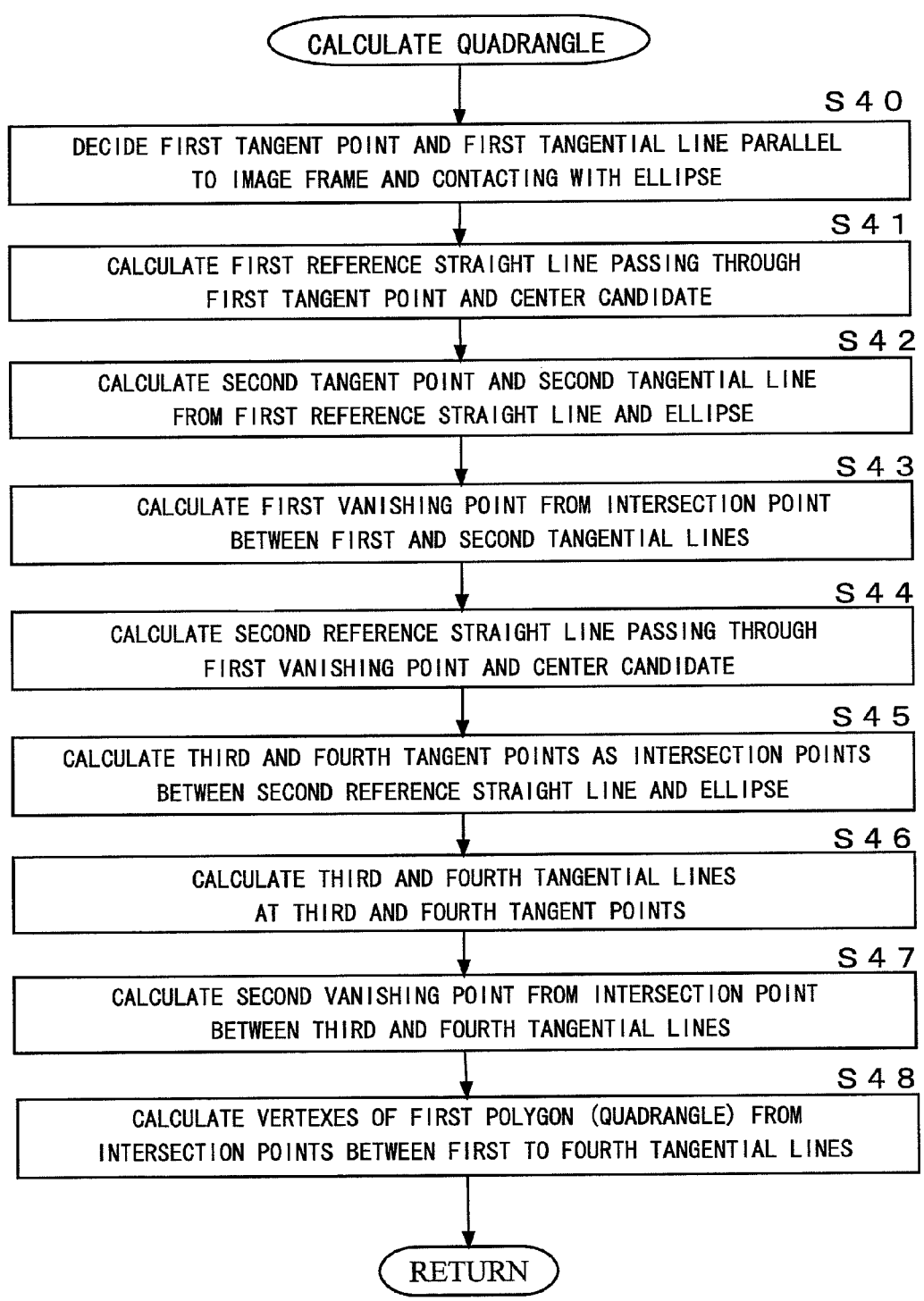
FIG. 15 is a flowchart showing an exemplary subroutine for calculating a quadrangle in first and second variants for calculating a quadrangle contacting with an ellipse.
Figure 16:
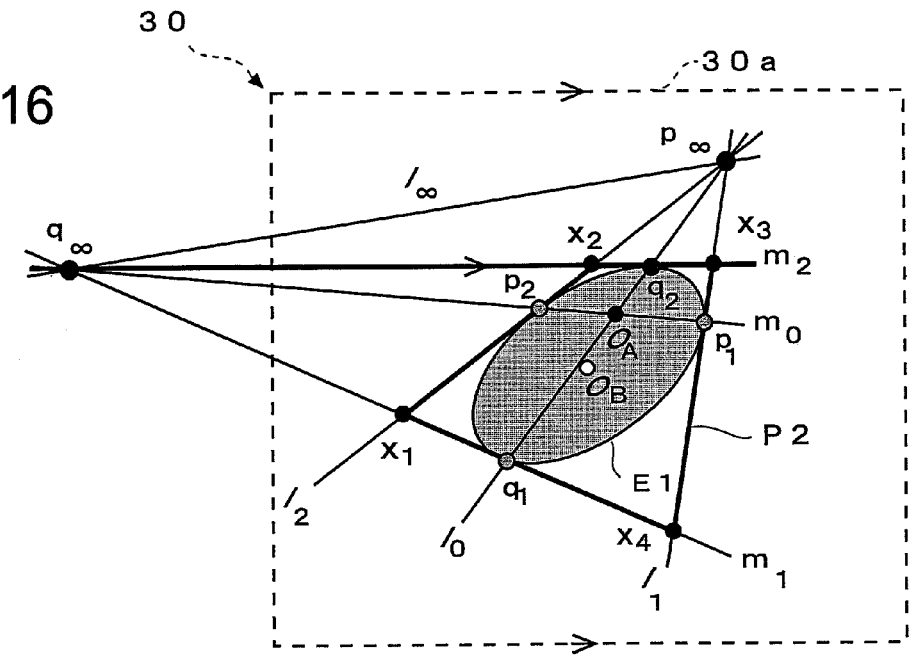
FIG. 16 is a schematic diagram showing the first variant for calculating a quadrangle contacting with an ellipse.
Figure 17:
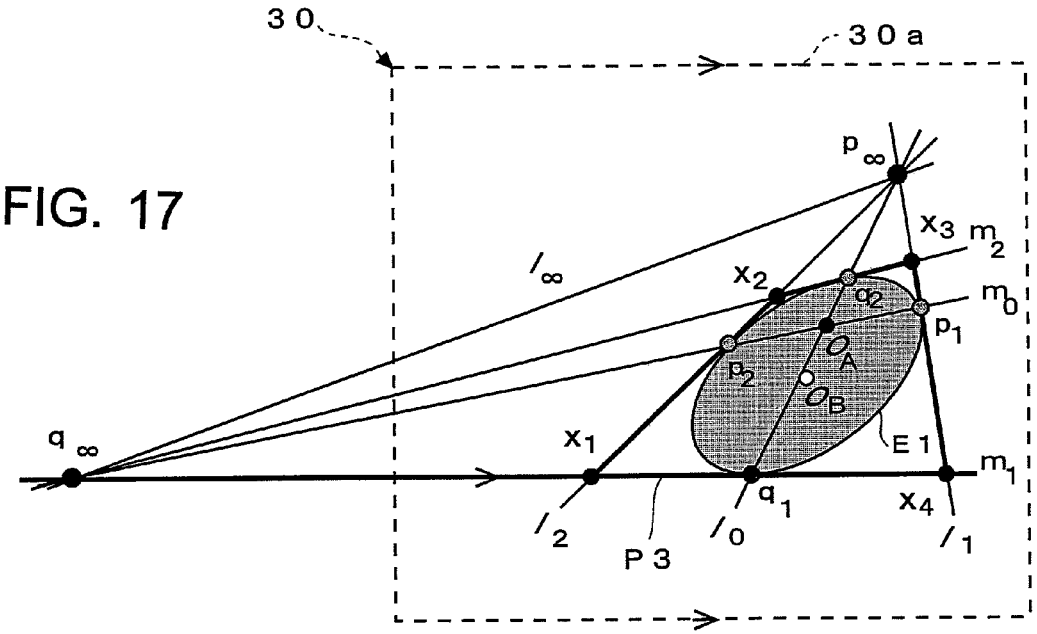
FIG. 17 is a schematic diagram showing the second variant for calculating a quadrangle contacting with an ellipse.

FIG. 15 is a flowchart showing an exemplary subroutine for calculating a quadrangle according to first and second variants for calculating a quadrangle contacting with an ellipse. FIG. 16 is a schematic diagram showing the first variant for calculating a quadrangle contacting with an ellipse. FIG. 17 is a schematic diagram showing the second variant for calculating a quadrangle contacting with an ellipse.

As shown in FIG. 15, at first, the portable terminal 10 decides the first tangent point and the first tangential line which is horizontal to the image frame and contact with the ellipse (step S40). Specifically, the control unit 16 in the portable terminal 10 decides the first tangent point $q_2$ and the first tangential line $m_2$ which are horizontal to the upper side 30a or lower side of the image frame 30 and contact with the ellipse E1 as shown in FIG. 16. The image frame 30 is a rectangular frame surrounding the photographed 2D entire image, for example.

Then, the portable terminal 10 calculates the first reference straight line passing through the first tangent point and the center candidate (step S41). Specifically, the control unit 16 calculates the first reference straight line $l_0$ passing through the first tangent point $q_2$ and the center candidate $O_A$.

Then, the portable terminal 10 calculates the second tangent point and the second tangential line from the first reference straight line and the ellipse (step S42). Specifically, the control unit 16 calculates the second tangent point $q_1$ from the intersection point between the first reference straight line $l_0$ and the ellipse E1, and calculates the second tangential line $m_1$ contacting with the ellipse E1 at the second tangent point $q_1$.

Then, the portable terminal 10 calculates the first vanishing point from the intersection point between the first tangential line and the second tangential line (step S43). Specifically, the control unit 16 calculates the first vanishing point $q_\infty$ from the intersection point between the first tangential line $m_2$ and the second tangential line $m_1$. Step S44 to step S48 are the same as step S34 to step S38, and finally the quadrangle P2 as shown in FIG. 16 can be obtained.

In this way, the portable terminal 10 functions as an exemplary polygon calculating means that calculates the quadrangle as an exemplary first polygon whose tangent point $q_2$ is the intersection point between the straight line passing through the center candidate $O_A$ and the ellipse E1. The portable terminal 10 functions as an exemplary polygon calculating means that uses, as the tangent point $q_2$, the point where the straight line $m_2$ parallel to any side 30a of the image frame 30 surrounding the target image contacts with the ellipse E1.

According to the present variant, with the projective transformation from the quadrangle P2 into the square P1', when the target image is projectively transformed, the standard image with less image rotation in the circumferential direction can be obtained for the target image. Thus, the user can easily compare the target image with the obtained standard image, thereby easily editing the image.

As shown in FIG. 17, for the second variant for calculating a quadrangle in an target area to be modified, in step S40, the first tangent point $q_1$ and the first tangential line $m_1$ which are horizontal to the upper side 30a or lower side of the image frame 30 and contact with the ellipse E1 may be decided. Finally, similar effects to the first variant can be obtained except the different shape of the quadrangle P3. In this way, the portable terminal 10 functions as an exemplary polygon calculating means that calculates the quadrangle as an exemplary first polygon whose tangent point $q_1$ is the intersection point between the straight line passing through the center candidate $O_A$ and the ellipse E1. The portable terminal 10 functions as an exemplary polygon calculating means that uses, as the tangent point $q_1$, the point where the straight line $m_1$ parallel to any side 30a of the image frame 30 surrounding the target image contacts with the ellipse E1. The reference straight lines $l_0$, $m_0$ may be arbitrary straight lines passing through the center candidate $O_A$ and may intersect with each other at the center candidate $O_A$, and thus various lines can be taken.

A third variant for calculating a quadrangle in a target area to be modified will be described below with reference to the drawings.

Figure 18A:
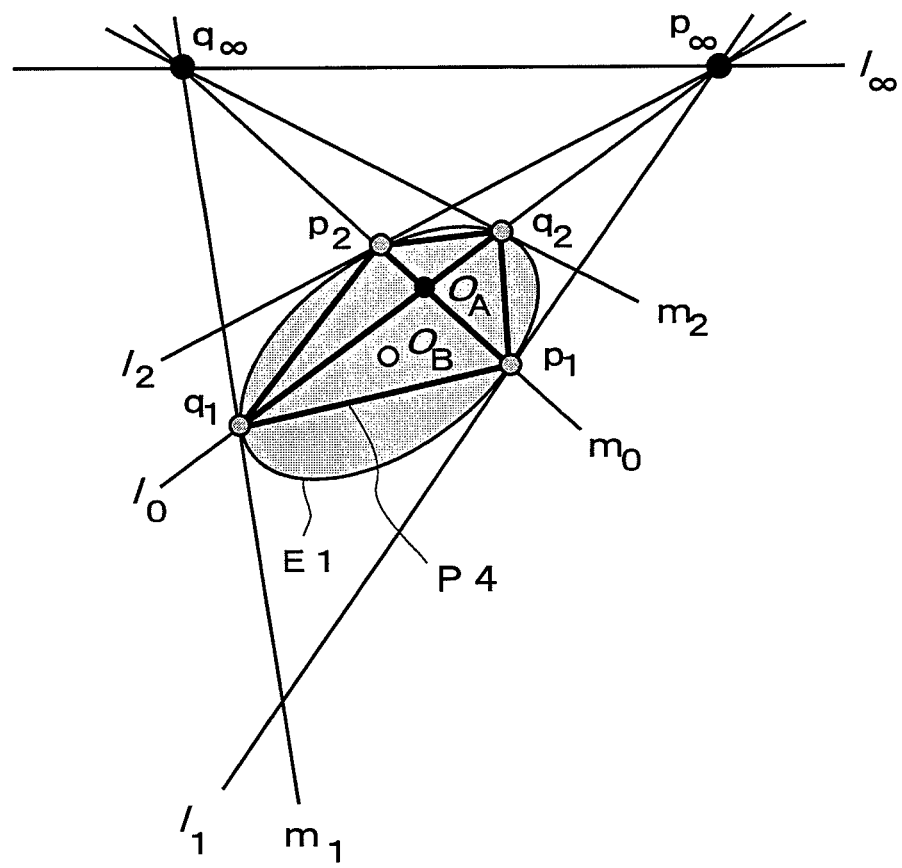
Figure 18:
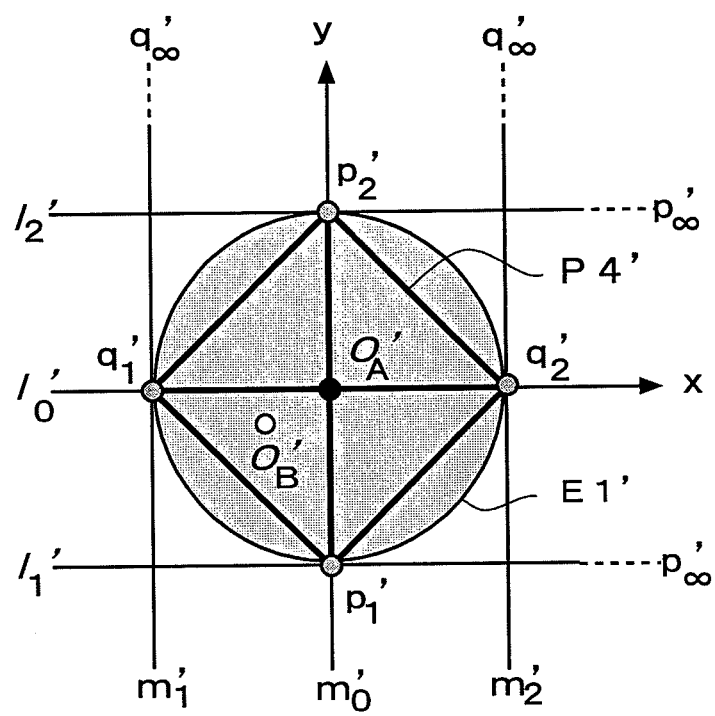
FIG. 18 shows a third variant for calculating a quadrangle contacting with an ellipse, where

FIG. 18 shows the third variant for calculating a quadrangle contacting with an ellipse, where FIG. 18(A) is a schematic diagram showing an exemplary quadrangle inscribed with an ellipse and FIG. 18(B) is a schematic diagram showing the projectively-transformed quadrangle.

As shown in FIG. 18(A), the quadrangle for calculating the projective transformation matrix P is a quadrangle P4 having the tangent points $p_1$, $q_1$, $p_2$ and $q_2$ as the vertexes. The quadrangle P4 is inscribed with the ellipse E1. In this case, the second polygon for calculating the projective transformation matrix P is a square P4' which has the tangent points $p_1'$, $q_1'$, $p_2'$ and $q_2'$ as the vertexes and is inscribed with the circle E1' as shown in FIG. 18(B). In this case, the projective transformation matrix calculating means calculates the projective transformation matrix for projectively transforming the quadrangle P4 into the square P4' inscribed with the ellipse (the circle E1' in the present variant) whose center is the point $O_A'$ where the center candidate $O_A$ is projectively transformed.

In the present variant, until step S35 or step S45, if the first tangent point, the second tangent point, the third tangent point and the fourth tangent point are found, the vertexes of the quadrangle P4 are calculated.

In this way, the portable terminal 10 functions as an exemplary polygon calculating means that calculates the first polygon associated with the ellipse and the center candidate. The portable terminal 10 functions as an exemplary polygon calculating means that calculates the quadrangle as an exemplary first polygon whose tangent points are the intersection points between the straight lines passing through the center candidate and the ellipse.

In the present variant, the vertexes of the quadrangle P4 for calculating the projective transformation matrix P are easily obtained as the first tangent point, the second tangent point, the third tangent point and the fourth tangent point.

A fourth variant for calculating a quadrangle in a target area to be modified will be described below with reference to the drawings.

Figure 19A:
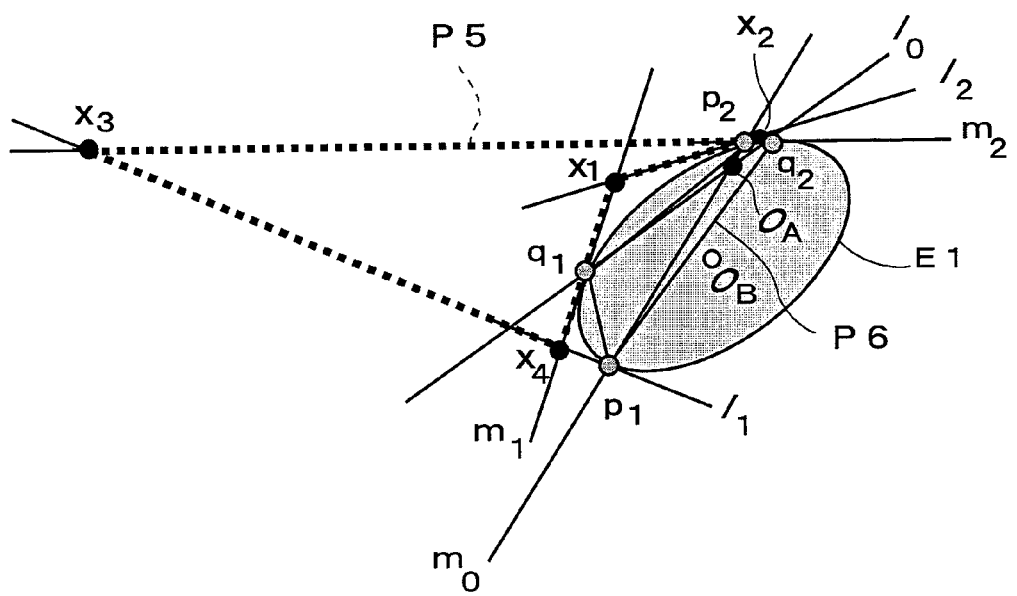
FIG. 19(A) is a schematic diagram showing an exemplary quadrangle contacting with an ellipse and FIG. 19(B) is a schematic diagram showing the projectively-transformed quadrangle.
Figure 19B:
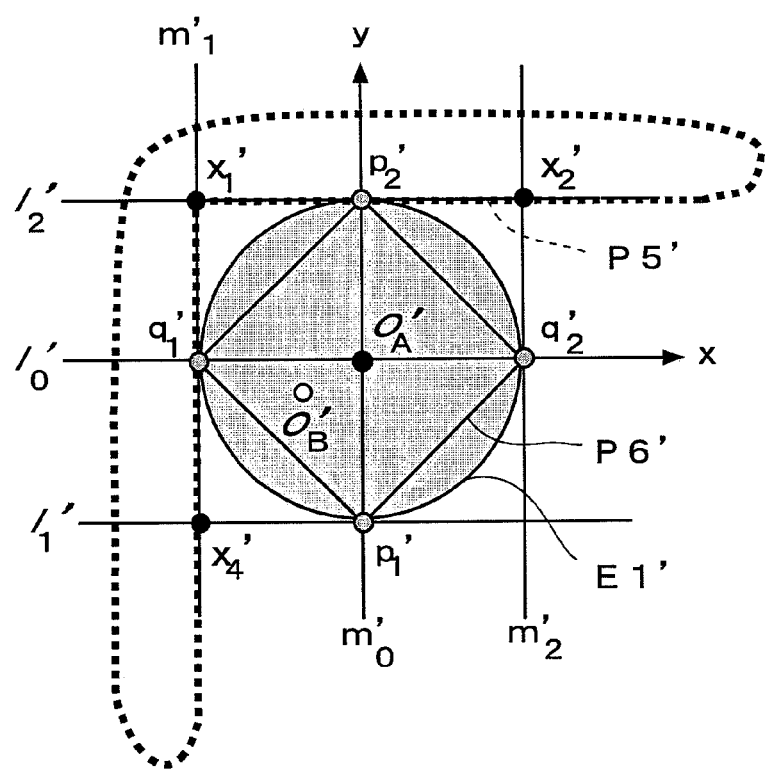

FIG. 19 shows the fourth variant for calculating a quadrangle contacting with an ellipse, where FIG. 19(A) is a schematic diagram showing an exemplary quadrangle contacting with an ellipse and FIG. 19(B) is a schematic diagram showing the projectively-transformed quadrangle.

The present variant is a case in which the center candidate $O_A$ is near the edge of the ellipse E1 as shown in FIG. 19(A). In the present variant, the quadrangle circumscribed with the ellipse E1 is a quadrangle P5 and the quadrangle inscribed with the ellipse E1 is a quadrangle P6. The first reference straight line $l_0$ and the second reference straight line $m_0$ are found as arbitrary straight lines passing through the center candidate $O_A$ and as the lines intersecting with each other at the center candidate $O_A$.

In the present variant, the quadrangle P5 circumscribed with the ellipse E1 at the tangent points $p_1$, $q_1$, $p_2$ and $q_2$ does not surround the ellipse E1. Thus, the second polygon for calculating the projective transformation matrix P has the coordinate $(-\infty, -\infty)$ of $x_3'$ corresponding to the vertex $x_3$, and is conceptually a second polygon P5' as indicated with a dotted line in FIG. 19(B). In this way, even when the quadrangle P5 does not surround the ellipse E1, the projective transformation matrix P can be calculated. In this case, the projective transformation matrix calculating means calculates the projective transformation matrix for projectively transforming the quadrangle P5 into the polygon P5' associated with the ellipse (the circle E1' in the present variant) whose center is the point $O_A'$ where the center candidate $O_A$ is projectively transformed.

On the other hand, in the case of the quadrangle P6 inscribed with the ellipse E1 at the tangent points $p_1$, $q_1$, $p_2$ and $q_2$, the second polygon for calculating the projective transformation matrix P is the square P6' which has the tangent points $p_1'$, $q_1'$, $p_2'$ and $q_2'$ as the vertexes and is inscribed with the circle E1' as shown in FIG. 19(B). In this way, in the case of the inscribed quadrangle P6, even when the center candidate is near the edge of the ellipse, the second polygon can be intuitively recognized. In this case, the projective transformation matrix calculating means calculates the projective transformation matrix for projectively transforming the quadrangle P6 into the square P6' circumscribed with the ellipse (the circle E1' in the present variant) whose center is the point $O_A'$ where the center candidate $O_A$ is projectively transformed.

An exemplary polygon may be a triangle or pentagon. In order to calculate the projective transformation matrix P, at least four coordinates may only be decided in association with the ellipse E1 and the center candidate $O_A$ for the target image before the transformation. In the case of a triangle, in order to calculate the projective transformation matrix P, a point on a side, the center of gravity, the incenter or the circumcenter of the triangle may be the fourth coordinate in addition to the three vertexes. The second polygon may only be an equiangular polygon such as regular triangle, square, rectangle, regular pentagon, or a regular polygon, or may be a figure associated with the projectively-transformed circle E1', and a figure to be able to calculate the projective transformation matrix P. The second polygon is not limited to a regular polygon. The ellipse inscribed or circumscribed with the second polygon, whose center is the point where the center candidate is projectively transformed, is not limited to a circle.

The image searching server 20 may compute the standard image as the transformation image displayed in a desired orientation from the target image as an image processing apparatus. For example, the portable terminal 10 transmits the image data including the photographed target image as the search-requested image to the image searching server 20 via the network 3. The reception unit in the image searching server 20 functions as image obtaining means to transform the image into the standard image at the image searching server 20 side, and the image searching server 20 makes a search based on the standard image. The image searching server 20 transmits the search result to the portable terminal 10.

There may be employed a form of fetching the target image photographed by a digital camera not only into the portable terminal 10 such as portable wireless phone but also into a personal computer installed with a program by which the method according to the embodiment functions, and of computing the standard image as the transformation image displayed in a desired orientation. The processings by the image searching server 20 in the image searching system 1 may be performed in a single server or may be distributed in a plurality of servers. The searching server may not be provided, the standard image may be simply obtained, for example, or the obtained standard image may be used to perform a different processing from the searching.

The target image is not limited to a flower image and may be other circular shape such as dish, cup, CD, DVD, clockface or roadway sign. Alternatively, the target image is not limited to a flower image and may be an elliptical or planar object, for example.

The present invention is not limited to the above embodiment. The above embodiment is exemplary and any embodiment having substantially the same structure as the technical spirit described in claims of the present invention and having similar operational effects may be encompassed in the technical range of the present invention.

DESCRIPTION OF REFERENCE NUMERALS

10: Portable terminal
15: Storage unit
14: Photographing unit
16: Control unit
20: Image searching server
21: Control unit
21b: Storage unit
22: Database
30: Image frame
E1: Ellipse
F1: Contour of flower
F2: Contour of the center of flower
$O_A$: Center candidate
P1: Quadrangle (first polygon)
P1': Square (second polygon)

The invention claimed is:

1. An image processing apparatus for performing an image processing for a target image, comprising:
an ellipse calculating unit that calculates an ellipse by which the target image is approximated;
a center candidate deciding unit that decides a center candidate of the target image;
a polygon calculating unit that calculates a first polygon associated with the ellipse and the center candidate;
a projective transformation matrix calculating unit that calculates a projective transformation matrix which projectively transforms the first polygon into a second polygon associated with an ellipse whose center is a point where the center candidate is projectively transformed; and
a transformation image obtaining unit that projectively transforms the target image based on the projective transformation matrix and obtains a transformation image.

2. The image processing apparatus according to claim 1, wherein the projective transformation matrix calculating unit calculates a projective transformation matrix which projectively transforms the first polygon into a second polygon which is inscribed or circumscribed with an ellipse whose center is a point where the center candidate is projectively transformed.

3. The image processing apparatus according to claim 1, wherein an ellipse whose center is a point where the center candidate is projectively transformed in the projective transformation matrix calculating unit is a circle.

4. The image processing apparatus according to claim 1, wherein the polygon calculating unit calculates the first polygon whose tangent points to the ellipse are intersection points between a straight line passing through the center candidate and the ellipse.

5. The image processing apparatus according to claim 4, wherein the polygon calculating unit assumes a straight line parallel to the major axis of the ellipse as a straight line passing through the center candidate.

6. The image processing apparatus according to claim 4, wherein the polygon calculating unit uses, as the tangent points, points where a straight line parallel to any side of an image frame surrounding the target image is tangent to the ellipse.

7. The image processing apparatus according to claim 1, wherein the polygon calculating unit calculates a quadrangle associated with the ellipse and the center candidate, and the projective transformation matrix calculating unit calculates a projective transformation matrix which projectively transforms the quadrangle into a square associated with an ellipse whose center is a point where the center candidate is projectively transformed.

8. The image processing apparatus according to claim 1, wherein the center candidate deciding unit extracts a center candidate image including the center candidate from the target image and decides the center candidate from an intersection point between the major axis and the minor axis of an ellipse by which the extracted center candidate image is approximated.

9. The image processing apparatus according to claim 5, wherein the target image is a flower image, the ellipse calculating unit calculates the ellipse by which the flower image is approximated, and the center candidate deciding unit decides the center candidate of the flower image inside of the center of the flower in the flower image.

10. The image processing apparatus according to claim 1, further comprising an image obtaining unit that obtains an image including the target image.

11. The image processing apparatus according to claim 10, further comprising a target image extracting unit that extracts the target image from the obtained image.

12. The image processing apparatus according to claim 1, further comprising a searching unit that searches information for specifying the target image based on the transformation image.

13. The image processing apparatus according to claim 12, wherein the searching unit extracts a feature quantity of the image from the transformation image and searches information for specifying the target image based on the feature quantity.

14. The image processing apparatus according to claim 1, wherein the second polygon is a regular polygon.

15. The image processing apparatus according to claim 1, further comprising a storing unit that stores the target image.

16. An image processing method for performing an image processing for a target image, comprising:

an ellipse calculating step of calculating an ellipse by which the target image is approximated;

a center candidate deciding step of deciding a center candidate of the target image after the image processing;

a polygon calculating step of calculating a first polygon associated with the ellipse and the center candidate;

a projective transformation matrix calculating step of calculating a projective transformation matrix which projectively transforms the first polygon into a second polygon associated with an ellipse whose center is a point where the center candidate is projectively transformed; and a transformation image obtaining step of projectively transforming the target image based on the projective transformation matrix and obtaining a transformation image.

17. A non-transitory computer-readable recording medium which records an image processing program for causing a computer to function as:

an ellipse calculating means that calculates an ellipse by which a target image is approximated to be subjected to an image processing;

a center candidate deciding means that decides a center candidate of the target image after the image processing;

a polygon calculating means that calculates a first polygon associated with the ellipse and the center candidate;

a projective transformation matrix calculating means that calculates a projective transformation matrix which projectively transforms the first polygon into a second polygon associated with an ellipse whose center is a point where the center candidate is projectively transformed; and a transformation image obtaining means that projectively transforms the target image based on the projective transformation matrix and obtains a transformation image.

* * * * *